United States Patent [19]

Honma et al.

[11] Patent Number: 4,876,612
[45] Date of Patent: Oct. 24, 1989

[54] IMAGE PROCESSING APPARATUS

[75] Inventors: Toshio Honma, Tokyo; Nobuyuki Watanabe, Yokohama, both of Japan

[73] Assignee: Canon Kabushiki Kaisha, Tokyo, Japan

[21] Appl. No.: 291,361

[22] Filed: Dec. 29, 1988

Related U.S. Application Data

[63] Continuation of Ser. No. 798,672, Nov. 15, 1985, abandoned.

[30] Foreign Application Priority Data

Nov. 19, 1984 [JP] Japan .................................. 59-243931

[51] Int. Cl.[4] ................................................ H04N 1/04
[52] U.S. Cl. .................................... 358/474; 358/471; 358/494; 250/578
[58] Field of Search ............ 358/293, 280, 294, 213.1, 358/285; 250/578

[56] References Cited

U.S. PATENT DOCUMENTS

| | | | |
|---|---|---|---|
| 4,228,489 | 10/1980 | Ford, Jr. ............................. | 358/288 |
| 4,358,794 | 11/1982 | Kurakami et al. ................... | 358/293 |
| 4,413,287 | 11/1983 | Torpie et al. ........................ | 358/288 |
| 4,620,233 | 10/1986 | Ogawa et al. ....................... | 358/293 |

FOREIGN PATENT DOCUMENTS

| | | |
|---|---|---|
| 19777A1 | 12/1980 | European Pat. Off. . |
| 91798A3 | 10/1983 | European Pat. Off. . |
| 106291A2 | 4/1984 | European Pat. Off. . |
| 2358921 | 6/1976 | Fed. Rep. of Germany . |
| 2518370 | 11/1976 | Fed. Rep. of Germany . |
| 3238458 | 5/1983 | Fed. Rep. of Germany . |
| 2114853A | 8/1983 | United Kingdom . |

Primary Examiner—Edward L. Coles, Sr.
Attorney, Agent, or Firm—Fitzpatrick, Cella, Harper & Scinto

[57] ABSTRACT

An image processing apparatus includes: a reading unit for reading a document, having a plurality of reading elements aligned in a predetermined direction; a first scan unit for moving relative to the document the reading unit in the direction inclined by a predetermined angle from the predetermined direction; and a second scan unit for moving relative to the document the reading unit such that a portion of the reading range of the reading unit is read in a overlap way at Nth scan and at (N+1)th scan by the first scan unit.

24 Claims, 24 Drawing Sheets

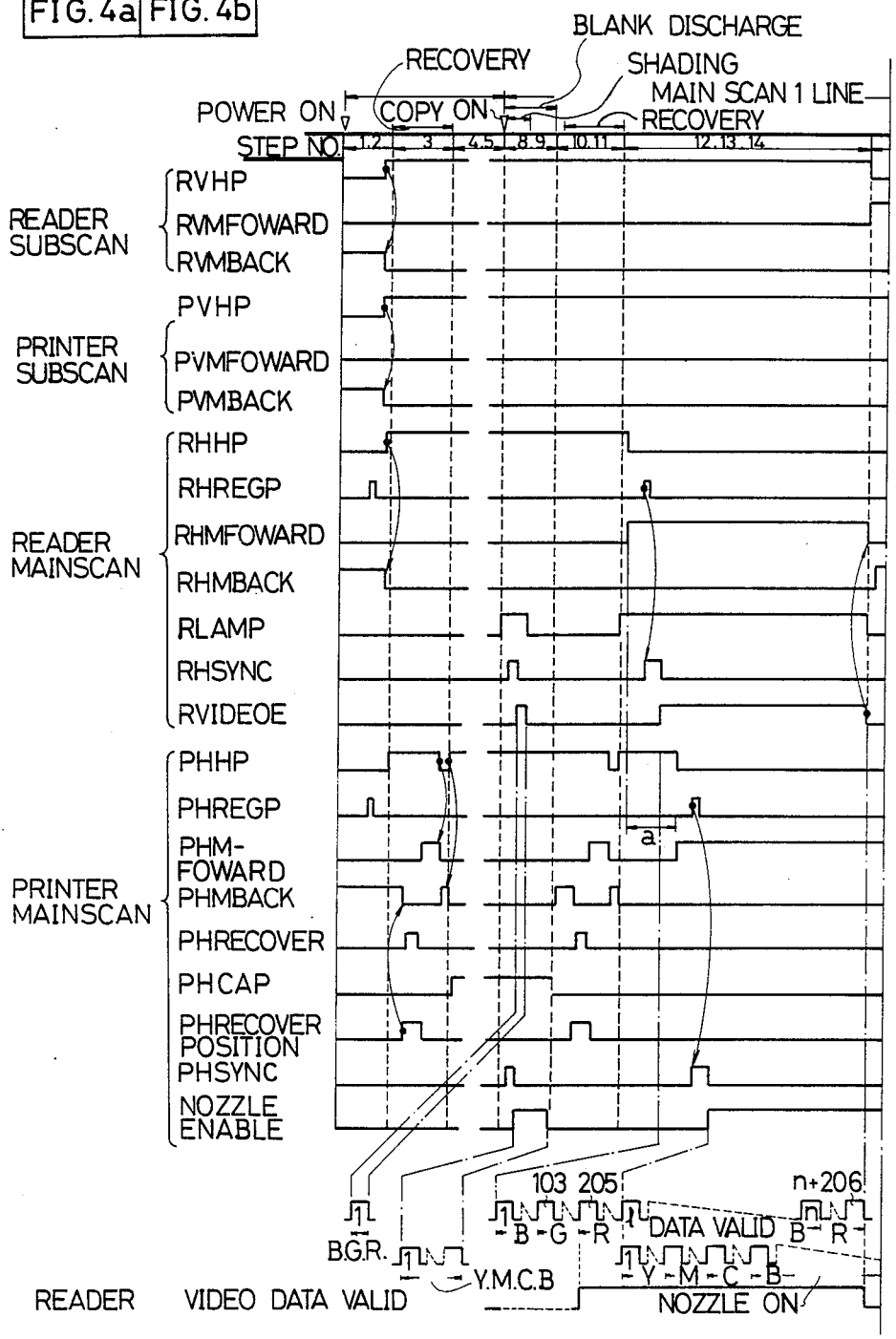

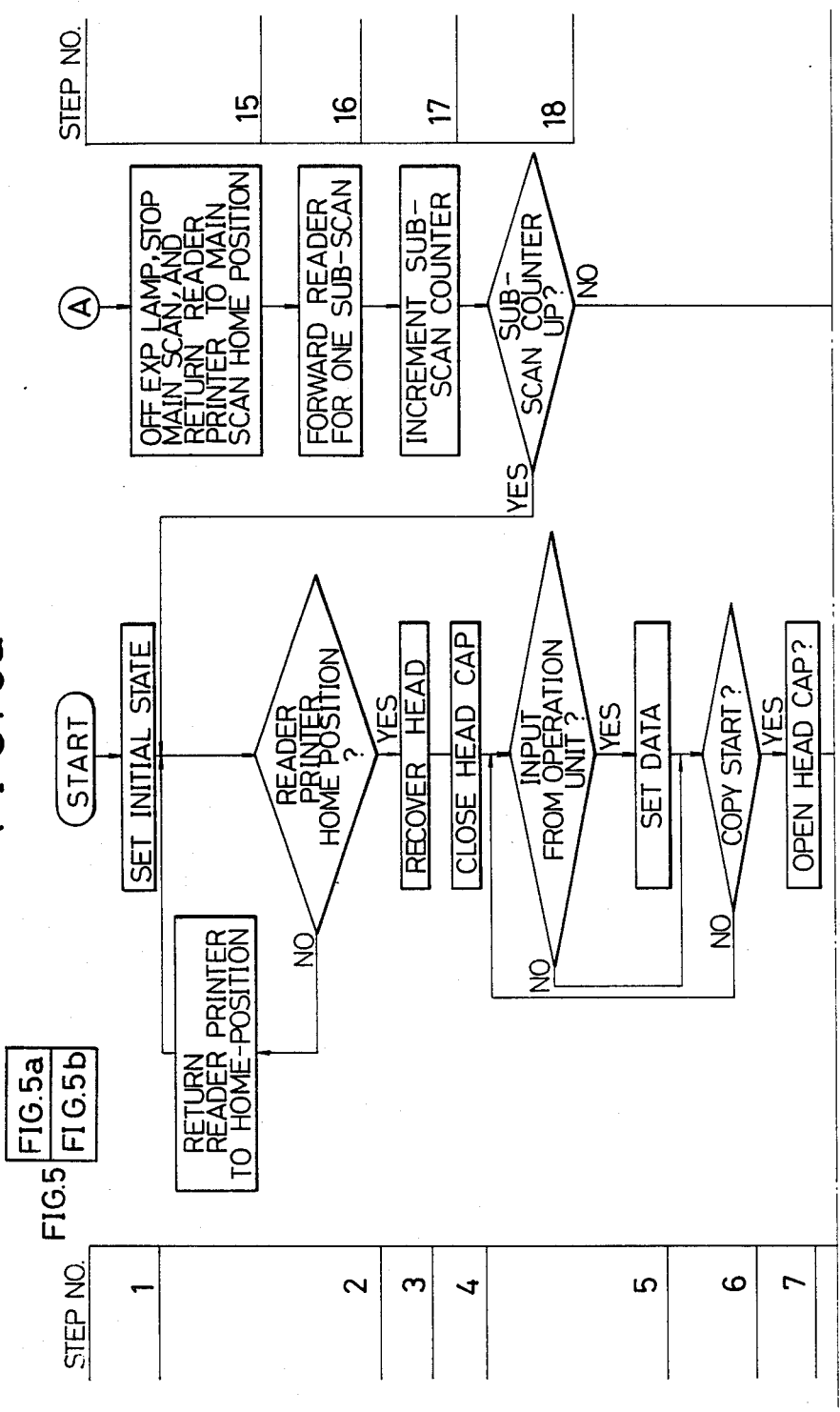

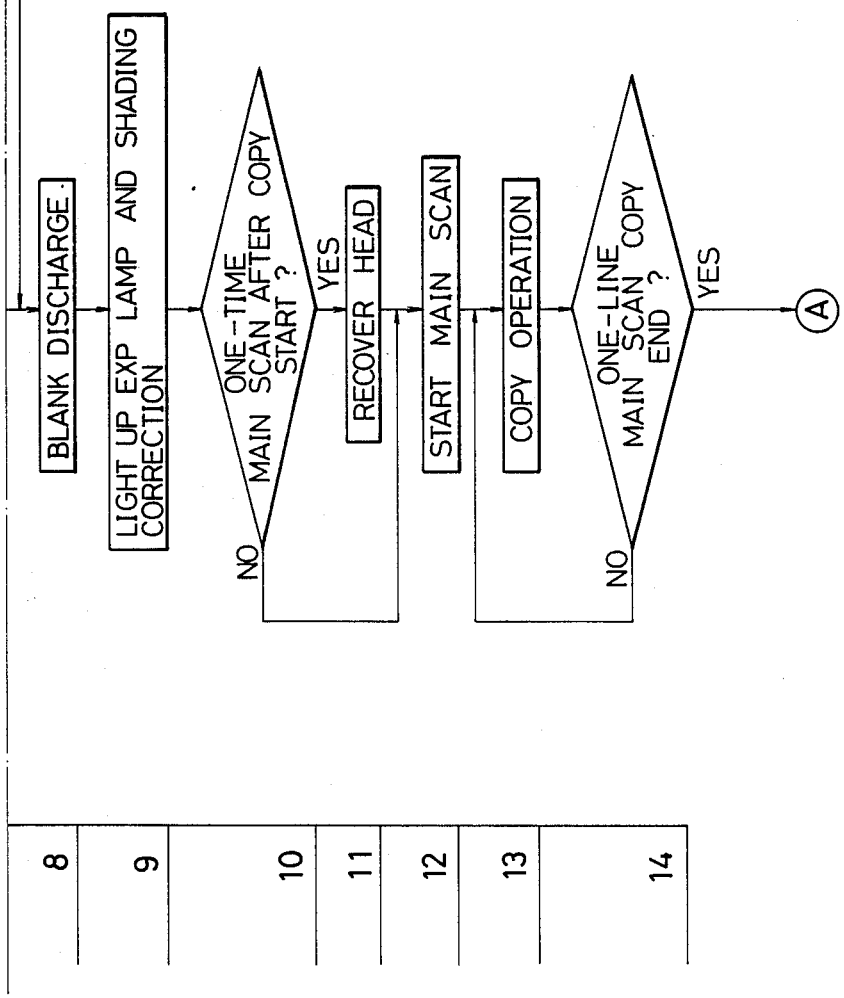

t = V.L.E. INTERVAL

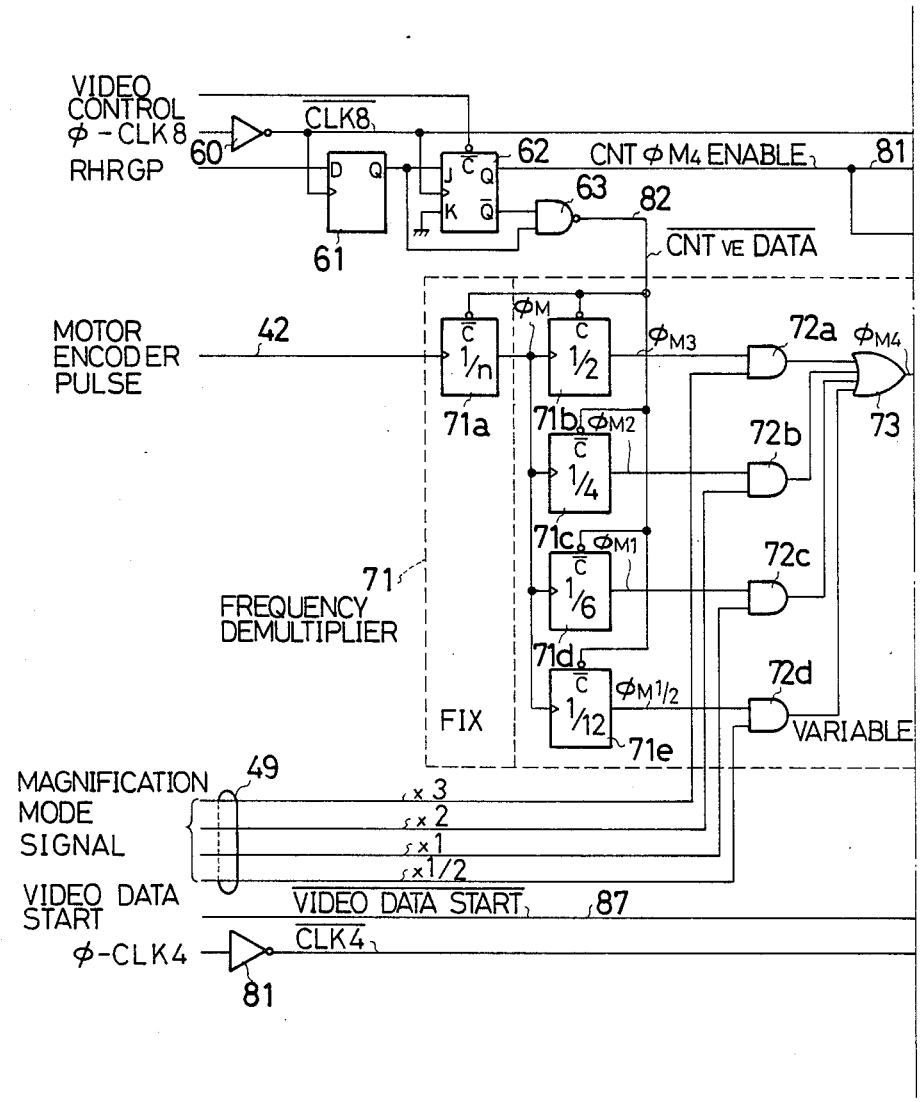

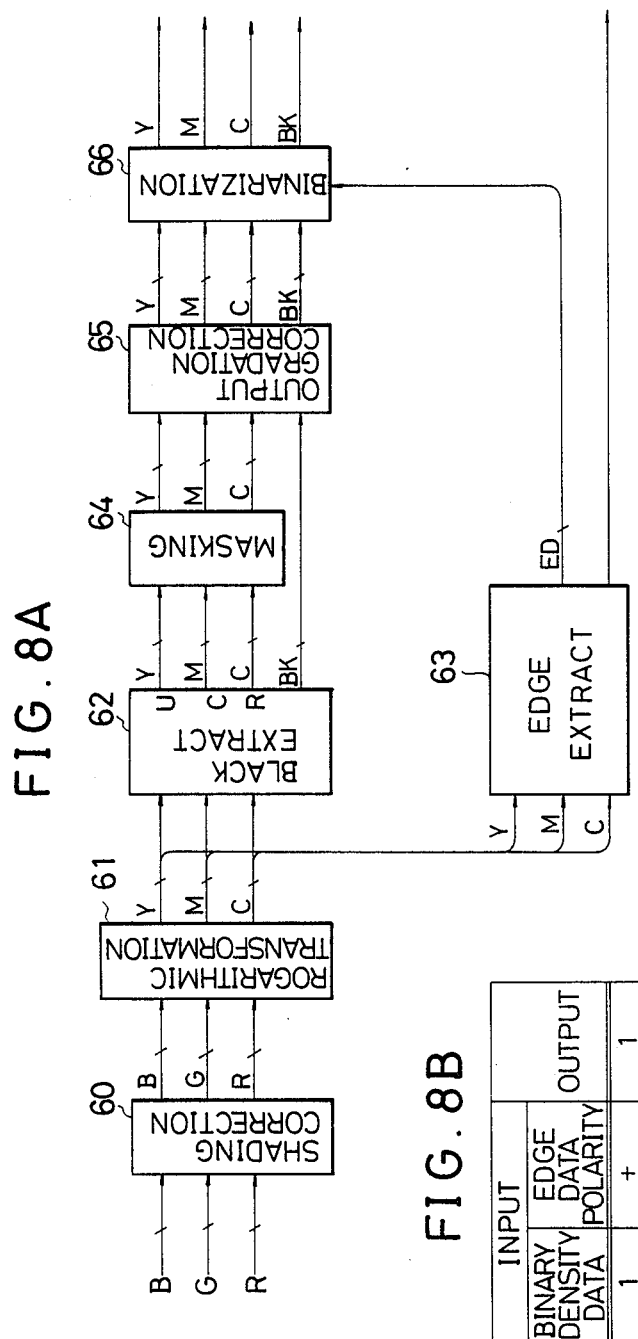

(A) $f(x)$ (B) $\dfrac{d^2 f}{dx^2}$ (C)

(D) $f(x) - \dfrac{d^2 f}{dx^2}$

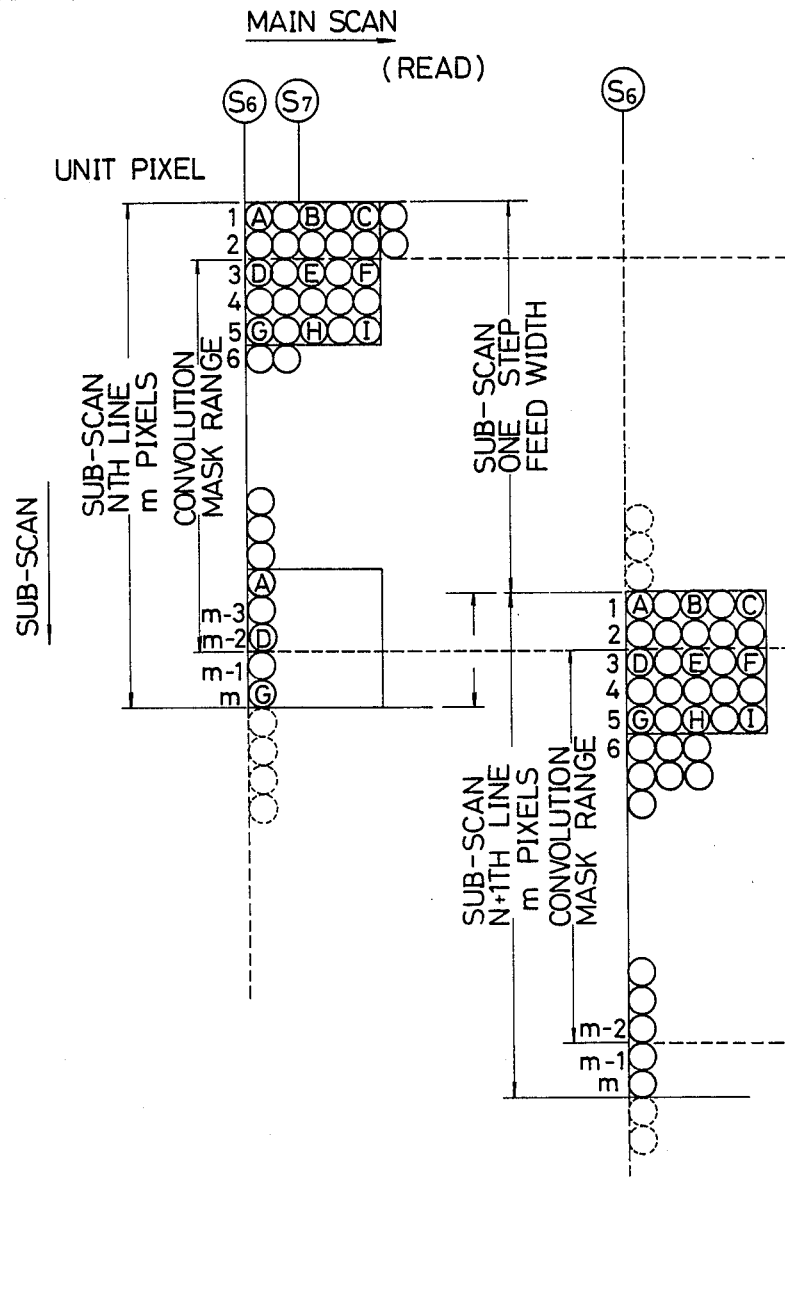

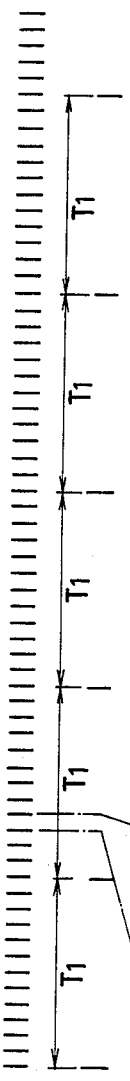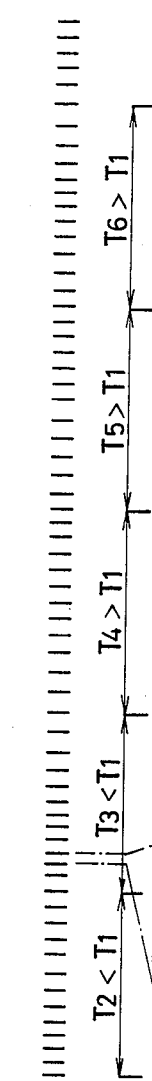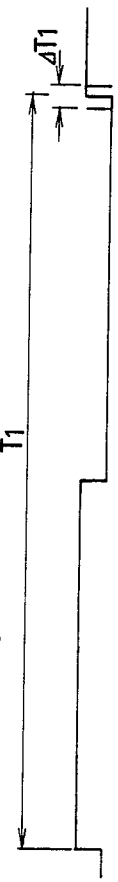
FIG12A IDEAL ENCODER PULSE
FIG12B IDEAL DEMULTIPLIED PULSE
FIG12C ENLARGED IDEAL ENCODER PULSE
FIG12D ACTUAL ENCODER PULSE
FIG12E ACTUAL DEMULTIPLIED PULSE
FIG12F ENLARGED ACTUAL ENCODER PULSE
FIG12G ENLARGED DEMULTIPLIED PULSE

IMAGE PROCESSING APPARATUS

This application is a continuation of application Ser. No. 798,672 filed Nov. 15, 1985 now abandoned.

BACKGROUND OF THE INVENTION

1. Field of the Invention

The present invention relates to an image processing apparatus having a document read section, and more particularly to an image processing apparatus of the type that image information is converted into electrical signals for image process.

2. Description of the Prior Art

Rapid developments in the field of image sensors such as CCDs and record devices such as ink jet devices have recently been made. With the advent of an elongated and multi-construction type device having a high resolution more than 400 dot/inch, it has become possible to realize, by using a digital type image forming apparatus, an image as good as that formed by using an analog type copy apparatus.

A technique of spatial filtering for sharpening images of such as TVs and CT scanners is also known in the art.

The spatial filtering technique is effective for the digital image forming apparatus to compensate for or correct: such as quantization errors in analog/digital converted image data; unfocussed images caused by area/density modulation through a dither method for performing gradation representation of binary coded images; or noises in the images.

A simple construction of a digital image forming apparatus is realized by using an image sensor and write head each having the same length as that of the object document. However, in case of a large size object document and color copy, the apparatus becomes extremely expensive because of a low manufacturing yield and the hardship in maintenance. Therefore, a scan method low in cost and good in performance has been considered heretofore, wherein an image sensor and write head of a smaller length are used for respectively reading and writing the same number of pixels. A partial image having a constant width is formed by main-scanning the image in the longitudinal and perpendicular directions, and the whole image is formed by repeating the main-scan followed by a sub-scan in the direction perpendicular to the main scan. In this scan method, however, the image is divided at the discontinuous portions between the main scans, which necessitates the need of storing some portion of the bottom pixel data required for processing the top pixel data or bottom pixel data of the image sensor and write head. Particularly, when a high resolution and large size image is desired, a large memory capacity is required which results in an extremely expensive apparatus.

SUMMARY OF THE INVENTION

It is an object of the present invention to solve the above problems and provide a digital image processing apparatus capable of obtaining a high quality image.

It is another object of the present invention to provide an image processing apparatus capable of obtaining a high quality image without use of additional memories, by reading in an overlap way, while repeating scans of an image sensor having a plurality of read elements, the division portion (or discontinuous portion) between Nth and (N+1)th scans of the image.

It is a further object of the present invention to provide an image processing apparatus wherein an image is read by using an image sensor having plural m read elements and recorded by a record head having plural n record elements, and the number m of read elements is set larger than n+k−1, where k represents the number of object pixels in the alignment direction of the record elements within the filtering process range of read-out outputs.

The above and other objects of the present invention will become more apparent from the following description when considered in connection with the accompanying drawings.

BRIEF DESCRIPTION OF THE DRAWINGS

FIGS. 4a–b are sequence timing charts;

FIGS. 5a–b are sequence flow charts;

FIG. 8A is a detailed circuit diagram of the image process circuit 33;

FIG. 8B is a block diagram between the input and output of the edge extract 63 of FIG. 8A;

FIG. 11a–b are views for explaining an example of the scan method according to the present invention; and FIG. 12A–G are timing charts of the encoded pulses and their demultiplied pulses.

DETAILED DESCRIPTION OF THE PREFERRED EMBODIMENTS

Outline of the Construction of the Apparatus

Figure 1:
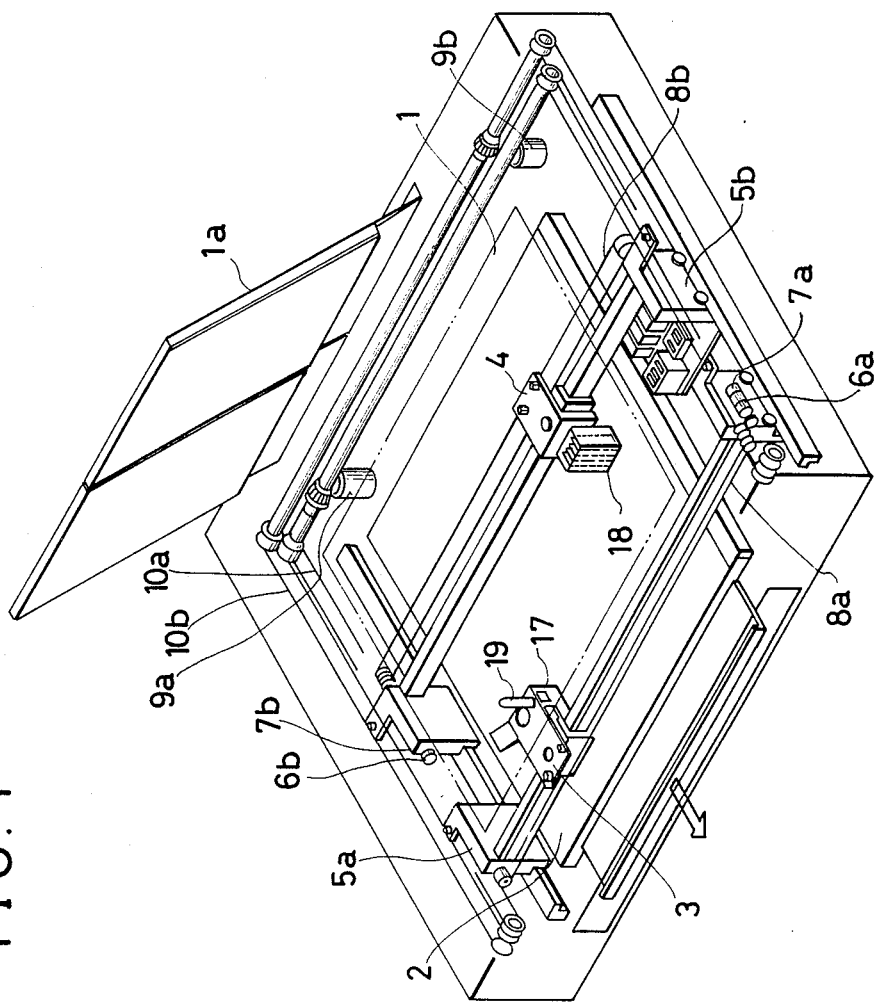
FIG. 1 is a perspective view of an embodiment of the image processing apparatus according to the present invention.
Figure 2:
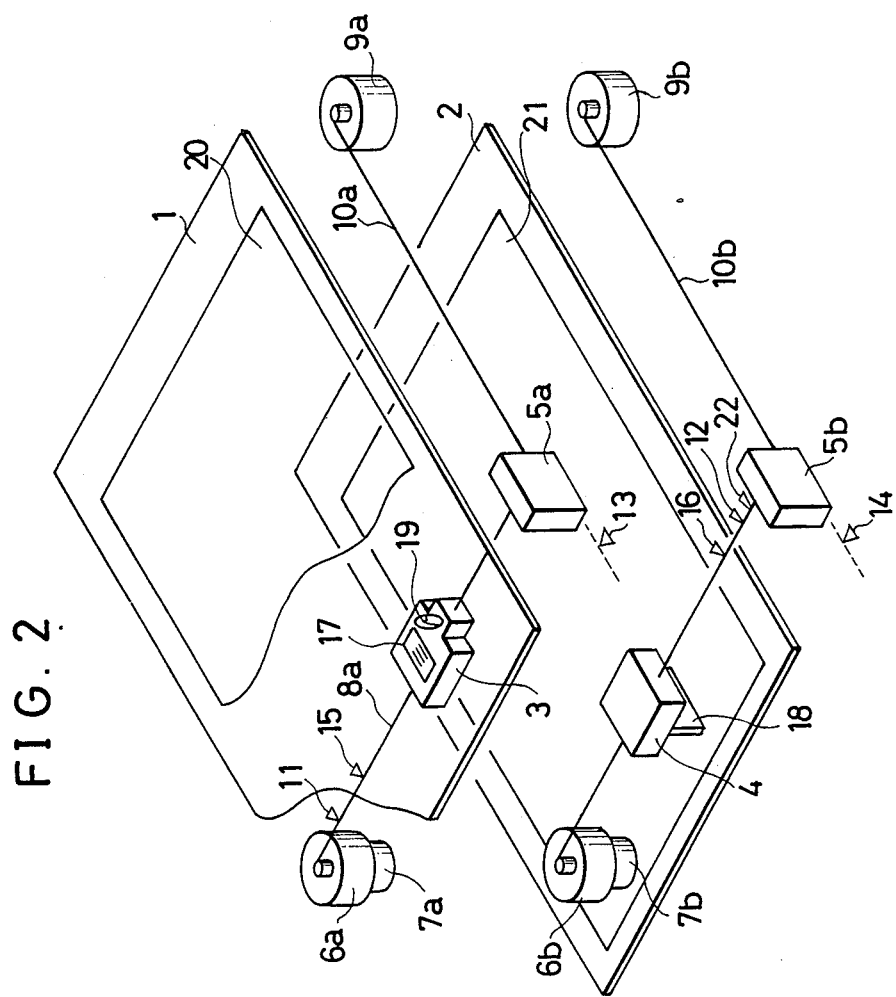
FIG. 2 schematically shows the apparatus of FIG. 1.

FIG. 1 is a perspective view of an embodiment of a digital color image forming apparatus, and FIG. 2 schematically shows the construction of the apparatus of FIG. 1. The construction of the present invention will be described by reference to FIGS. 1 and 2. A document supporting transparent glass 1 receives a document 20 on its level surface. The document 20 is pressed on the glass 1 by a press plate 1a, with the document surface facing the document supporting glass 1. A reader head 3 (hereinafter called reader) for reading the document 20 is provided with a reader sensor 17 (hereinafter called CCD unit) and an exposure lamp 19. The CCD unit 17 is constructed of a CCD array made of a plurality of read elements aligned in three rows for respective red, green and blue (hereinafter called R, G and B) colors. The reader 3 connected to a main scan wire 8a is driven by a main scan motor 6a. A sub-scan rack 5a connected to one end of the main scan wire 8a and to a sub-scan wire 10a is driven by a sub-scan motor 9a.

A copy sheet 21 is placed on a recording plate 2 and a copy image is recorded on the copy sheet 21 by a record head 4 (hereinafter called printer). The printer 4 is provided with a recorder unit 18 (hereinafter called BJ head unit) constructed of multiple ink jet heads (hereinafter called BJ heads since bubble jet heads are used in this embodiment) for respective yellow, magenta, cyan and black (hereinafter called Y, M, C and Bk) colors. The printer 4 connected to a main scan wire 8b is driven by a main scan motor 6b. A sub-scan rack 5b connected to one end of the main scan wire 8b and to a sub-scan wire 10b is driven by a sub-scan motor 9b.

To obtain a copy image using the reader 3 and printer 4 constructed as above, the reader 3 is driven by the main scan motor 6a and main scan wire 8a to move back and forth in the main scan direction. The exposure lamp 19 is turned on to read the document 20 from the lower side by using the CCD unit 17, and an electrical signal is outputted as image information. The printer 4, while being driven by the main scan motor 6b and main scan wire 8b to move back and forth in the main scan direction, performs printing an image on a copy sheet 21 in accordance with the read-out electrical signal. In this embodiment, the main scan directions of the reader 3 and printer 4 are set oppositely to each other. After the end of one main scan copy and after turning off the exposure lamp 19, the reader 3 and printer 4 are moved in the direction perpendicular to the main scan direction, i.e., in the sub-scan direction, to the position where the next main scan is carried out. The reader 3 connected to the sub-scan rack 5a through the main scan wire 8a is driven by the sub-scan motor 9a and sub-scan wire 10a and stopped at the predetermined position. The printer 4 connected to the sub-scan rack 5b through the main scan wire 8b is also driven by the sub-scan motor 9b and sub-scan wire 10b and stopped at the predetermined position.

Control Operation of the Apparatus ... Preliminary Operation

Figure 3A:
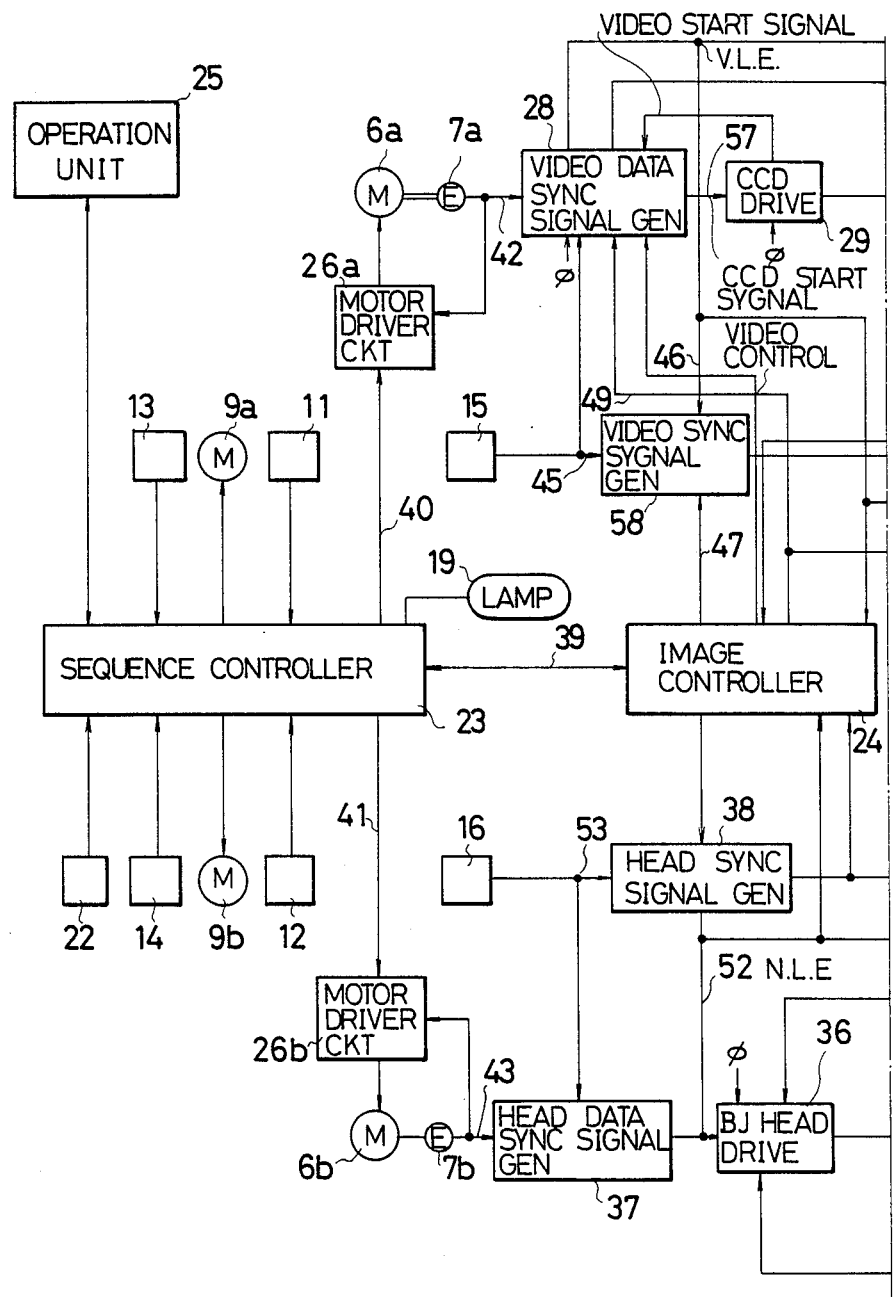
FIGS. 3a–b are block diagrams showing an example of a control circuit of the apparatus.
Figure 3B:
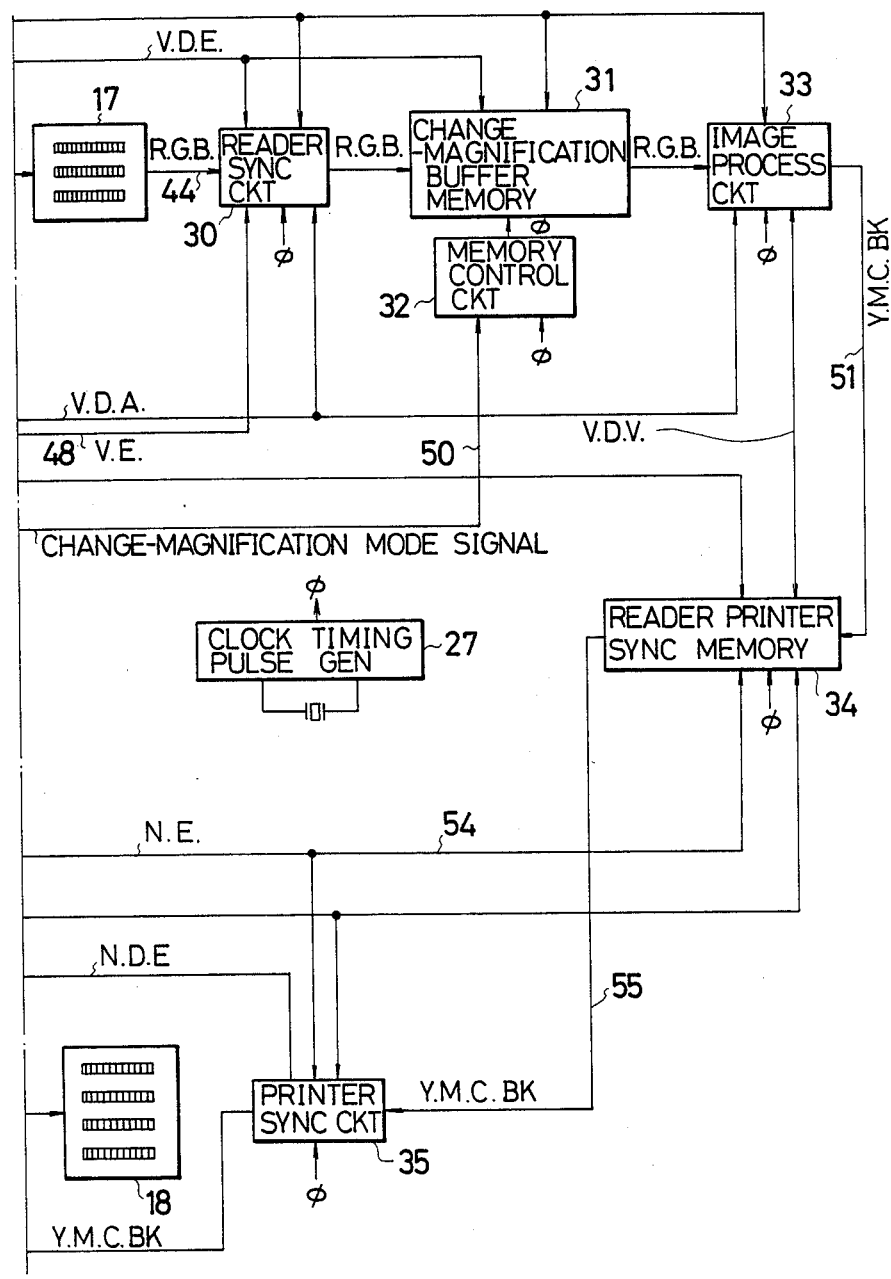
Figure 4B:
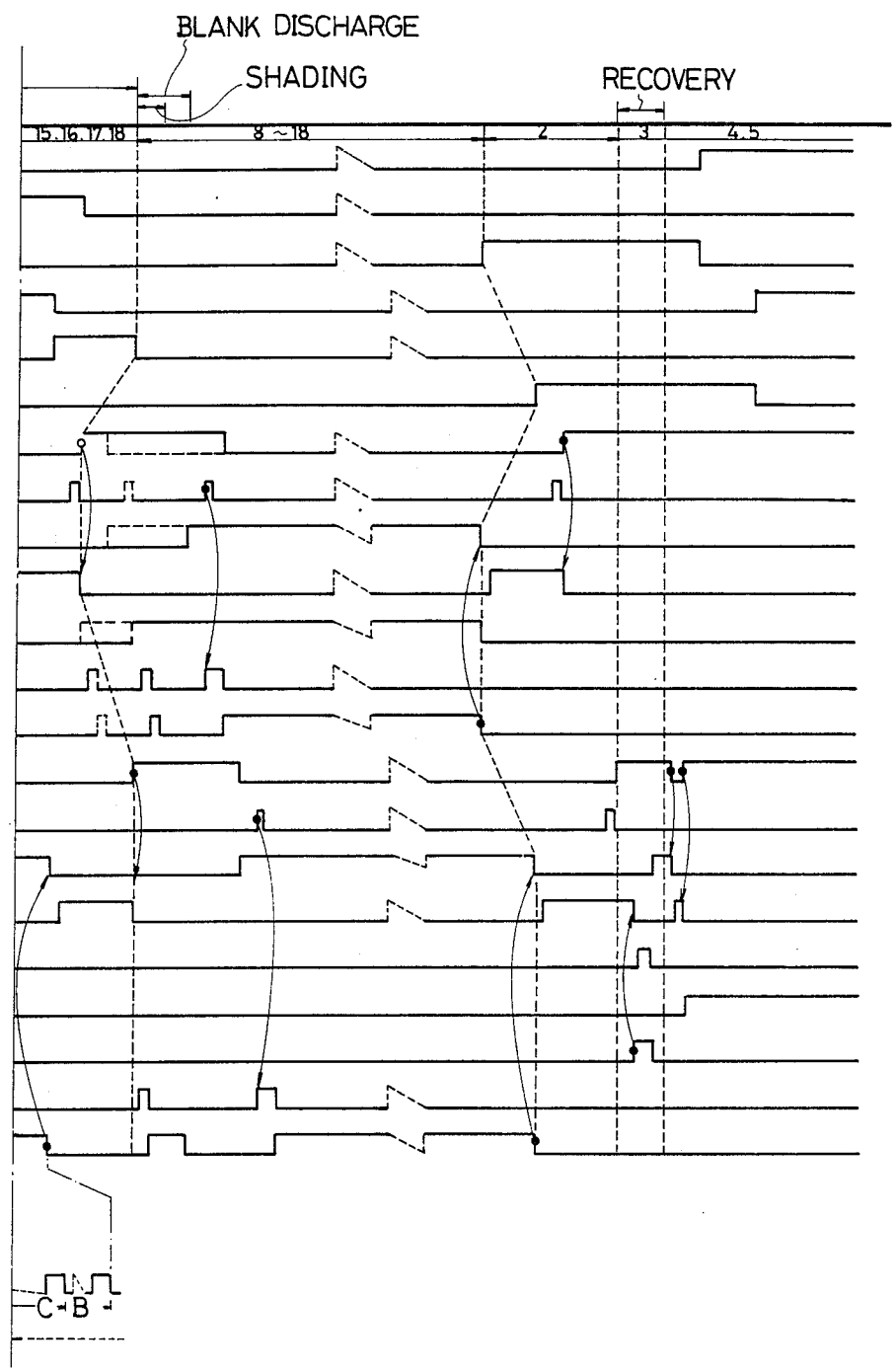

The block diagram of the control circuit of the above-embodied apparatus is shown in FIG. 3, and the overall sequence timing chart and program flow chart are respectively shown in FIGS. 4 and 5. The operation outline of the apparatus will be first described with reference to FIGS. 3, 4, 5 and 6. The same step numbers in the timing chart and flow chart represent the same step operation.

A sequence controller 23 and image controller 24 both includes microcomputer units, each storing programs for timing the sequence control and image data formation of the apparatus. Both microcomputers perform data transference over a line 39. The sequence following the turning on of the power supply will be described. As shown in the flow chart of FIG. 5, the sequence controller 23 sets an initial state for the apparatus at step 1. At step 2 the reader and printer are returned to the home-positions for main scan and sub-scan. Next, at step 3 the recover operation for the ink jet head is performed. The head recover operation is an operation to press or slide the head top portion against a material excellent in water absorption, such as a porous material, in order to remove any dried ink at the tip of the ink jet nozzle. Specifically in the sequence, the printer main scan motor 6b is rotated backward and stopped upon detection of an output from a position sensor 22 of the recover system. Thereafter, a drive mechanism such as a solenoid for pressing the porous material against the head is turned on and the material is held against the head for a preset time. After this, the printer main scan motor 6b is rotated forward and stopped upon detection of an output from a main scan home position sensor 12.

At the next step 4, aimed at preventing a change of ink viscosity at the nozzle tip prior to the start of copy operation of the apparatus, closing a head cap is performed. This is accomplished by turning on a drive mechanism such as a solenoid for closing the head cap at the printer home position. At step 5, an input from an operation unit 25 by the operator is received. Input data is analyzed and a copy mode is set. At step 6, a check whether it is a copy start or not is made. If not, step 5 repeats. In case of a copy start, step 7 follows where the drive for closing the head cap is terminated to start copy operation. At step 8, prior to the copy operation, a blank discharge for the head is performed. Note that the blank discharge is carried out in order to ensure a stable recording. In particular, to prevent irregular jetting at the start of image forming, which might be caused for example by a change in viscosity of residual ink in the nozzle, the residual ink is jetted out and removed therefrom in accordance with the programmed conditions obtained from copy stoppage time, temperature in the apparatus (temperature sensor is not shown) and copy continuation time. Next at step 9, the exposure lamp 19 is turned off to perform a shading correction. The shading correction is an operation to sample correction data by reading prior to document scanning, a reference white plate serving as a basis of white data. The correction data is used for correcting aberration of optical lenses and sensitivity scattering of each bit of the CCD sensor.

Next at step 10, a check is made whether it is just after a copy start or not. If it is just after a copy start, that is, just before a one-time main scan, step 11 follows. If on the other hand it is a two-time main scan or more, step 12 follows. At step 11, a long stoppage of the apparatus is assumed and so a head recovery operation is performed. The recovery operation at step 11 is the same as described in step 3. At the next step 12, a main scanning starts. (as to respective signals in the above operations, refer to FIGS. 6A to 6F)

Control Operation of the Apparatus ... Copy

In a main scan operation, speed data corresponding to a magnification and a rotation start signal instructing a reader forward motion are supplied via a line 40 to a motor driver circuit 26a to turn on the reader main scan motor 6a. After a lapse of a certain delay time for synchronizing the reader and printer in conformity with an image magnification, a rotation start signal instructing a printer forward motion is supplied via a line 41 to a printer motor driver circuit 26b to turn on the printer main scan motor 6b. The number of revolutions of the reader and printer main scan motors 6a and 6b are locked respectively at the predetermined constant numbers, by comparing pulses (FG signals) from revolution number detecting rotary encoders 7a and 7b (hereinafter called encoders) with respective reference revolution numbers and performing PLL control, at the motor driver circuits 26a and 26b. The encoder pulses are supplied via respective lines 42 and 43 to the corresponding video data sync signal generator 28 and head data sync signal generator 37.

Processings on the Reader

Next, at step 13, a copy operation is performed. In the following description, FIGS. 7E and 7B are also referred to. As shown in FIG. 3, the video data sync signal generator 28 produces, in synchro with the encoder pulse from the reader main scan motor 6a, a video line enable signal (hereinafter called V.L.E.) shown in FIGS. 6A and 6B, which is position information in the reader main scan direction and is indicative of the effective range in the sub-scan direction of video data whose resolution is 1. The video data sync signal generator 28 further outputs, upon reception of a video data start signal from a CCD drive 29, a video data enable signal (V.D.E.) which is indicative of the data effective width of all CCD pixels and is in synchro with the encoder pulse. Simultaneously therewith, the video data sync signal generator 28 supplies via a line 57 to the CCD drive 29 a video start signal in synchro with the encoder pulse. The CCD start signal instructs an image read to the respective B, G and R three color CCDs in three rows of the CCD unit 17. Analog video signals for three colors read by the CCD unit 17 are gain-controlled to have the same sensor sensitivities for the respective colors and thereafter outputted on a line 44 in the form of an 8 bit digital value. At this time instant, the video data start signal indicative of the data effective range for all of the CCD pixels is outputted from the CCD drive 29. The digital video data for B, G and R three colors (hereinafter called video data) is inputted to a reader sync circuit 30.

A description of a video sync signal generator 58 will now be given. Inputted to the video sync signal generator 28 are a signal PHREGP on a line 45 from a reader resist position sensor 15, signal V.L.E. on a line 46 and the count value of signal V.L.E. counted in accordance with a copy magnification and supplied on a line 47 from the image controller 24. The time delay from the time when the CCD unit passes the reader resist position for image position alignment to the time when it reaches the top of a document, i.e., the read start position, is determined by counting the V.L.E. signal. The video sync signal generator 58 further outputs via a line 48 to the reader sync circuit 30 a video enable signal (hereinafter called V.E. signal) indicative of the read width in the main scan direction and corresponding to a copy size.

Figure 6A:
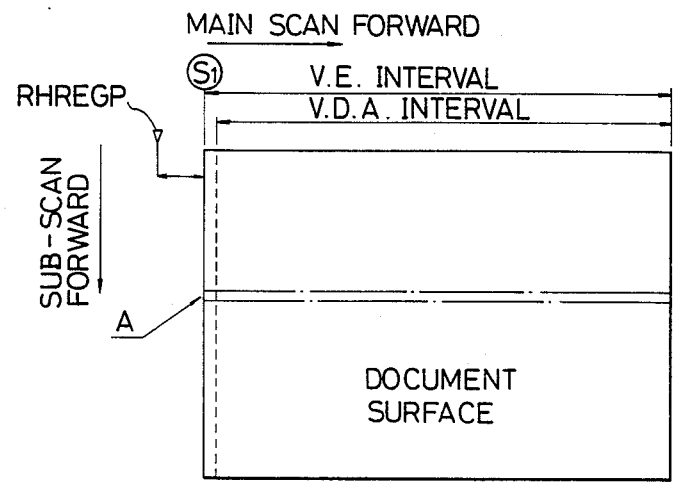
FIG. 6A shows a relationship between a document and reader read sync signals.
Figure 6B:
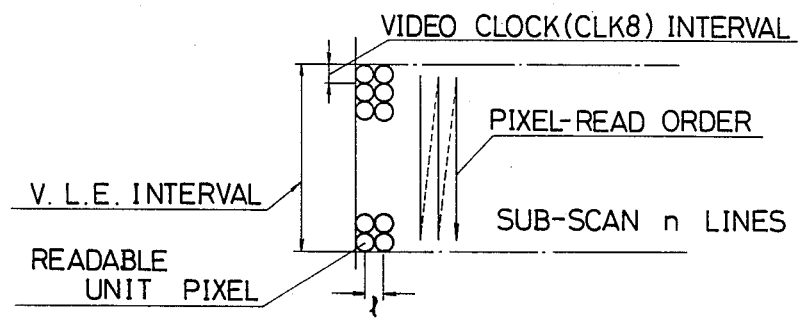
FIG. 6B is an enlarged view of the portion A of FIG. 6A.
Figure 6C:
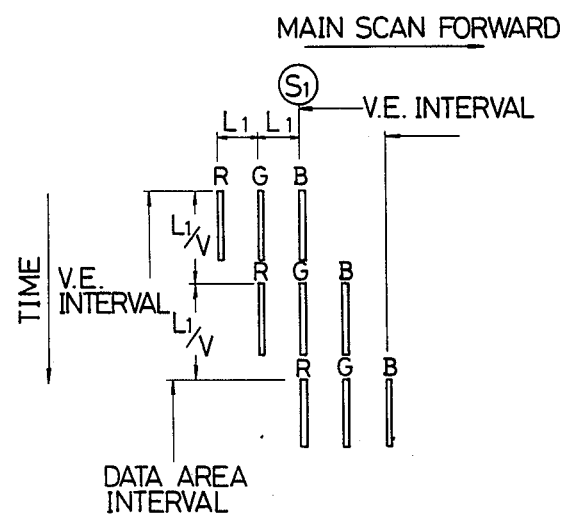
FIG. 6C is a view for explaining position displacements of respective color CCDs.

In the reader sync circuit 30, position alignment in the main scan direction is performed in order that the respective B, G and R color CCDs can read the same portion on the document, as shown in FIG. 6C. In particular, assuming that the distance between the adjoining B, G and R color CCDs is L1 and the main scan speed is V, then the timings when an image at position S1 of the document is inputted to the corresponding color CCDs are delayed respectively by L1/V. Therefore, until the time when the image at position S1 is lastly inputted to the R color CCDs, video data from the B and G color CCDs is temporarily stored in buffer memories in the reader sync circuit 30. After the B, G and R three color video data for an image at position S1 is collected, the video data is outputted from the reader sync circuit 30. The reader sync circuit 30 also outputs a video data area (V.D.A.) signal which indicates a state that all of the B, G and R color video data have been inputted after the V.E. signal or video data for the document is inputted. In FIG. 6C, the vertical direction is not the sub-scan direction but a time axis.

Video data after subjected to a color adjustment processing at the reader sync circuit is then inputted to a change-magnification buffer memory 31 where a change-magnification process is performed.

Magnification Process

Magnification process will be described with reference to FIGS. 7A to 7F. The magnification process in the main scan direction is performed by maintaining the printer scan speed V1 constant and changing the reader scan speed to V1/n (n represents a magnification). The reason for this is that since the upper frequency limit for driving the ink jet head serving as a image forming means of the printer is lower than that for the CCDs, the maximum drive frequency for the ink jet is used when an equal magnification copy operation is performed, thereby ensuring a highest copy speed. In this case, a change-magnification mode signal is supplied via line 39 of FIG. 3 from the image controller 24 to the video data sync signal generator 28. The V.L.E. signal is determined such that the frequency division or demultiplication ratios of the encoder pulses of the reader motor are set so that the same frequency both at the equal magnification and change-magnification is ensured (FIGS. 7A and 7B).

Figure 7A:
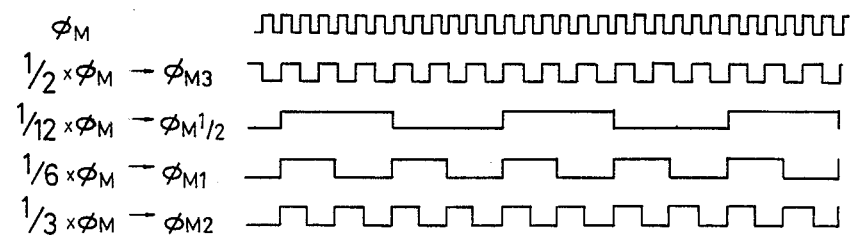
FIG. 7A is a view for explaining the demultiplied pulse timings, for each magnification, of the encoder pulses of the reader main scan motor.
Figure 7B:
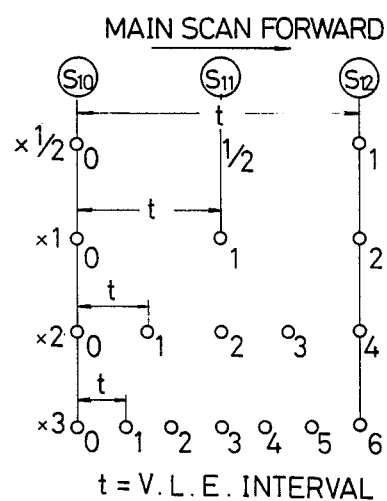
FIG. 7B is a view showing distances between readout pixels, for each magnification, in the main scan direction.

More in particular, as shown in FIG. 7A, the motor encoder pulses φM are divided by 1/6 as indicated by φM1 at the equal magnification, by 1/12 as indicated by φM½ at the ×½ magnification, by ⅓ as indicated by φM2 at the ×2 magnification, and by ¼ as indicated by φM3 at the ×3 magnification. The frequency of the motor encoder pulses becomes 2 times at the ×½ magnification, ½ times at the ×2 magnification, and ⅓ times at the ×3 magnification, respectively of the frequency at the equal magnification. As a result, the frequencies of φM1, φM2, φM3 and φM½ actually become the same.

Figure 7C:
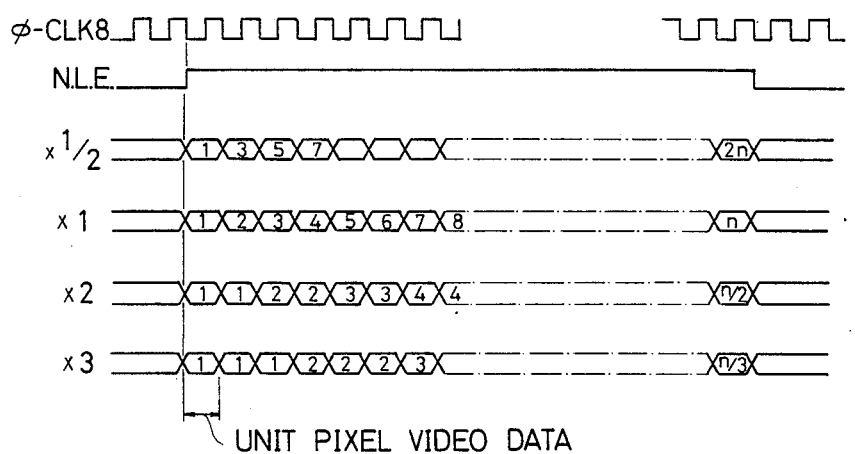
FIG. 7C is a view for explaining the interpolation and thinning operations for each magnification.

FIG. 7B shows the read-out positions on a document, or the length of movement of the CCDs during a constant time t (=V.L.E. interval). At the ×½ magnification, the length of movement is two times as long as that at the equal magnification, and at the ×2 magnification it is ½ as short as that at the equal magnification The change-magnification process in the sub-scan direction is performed by controlling the address count of the change-magnification buffer memory 31 when each pixel of the R, G and B video signal, which is supplied from the reader sync circuit 30 in synchro with a video clock (CLK 8), is stored in the change-magnification buffer memory 31 (FIG. 7C).

Figure 7D:
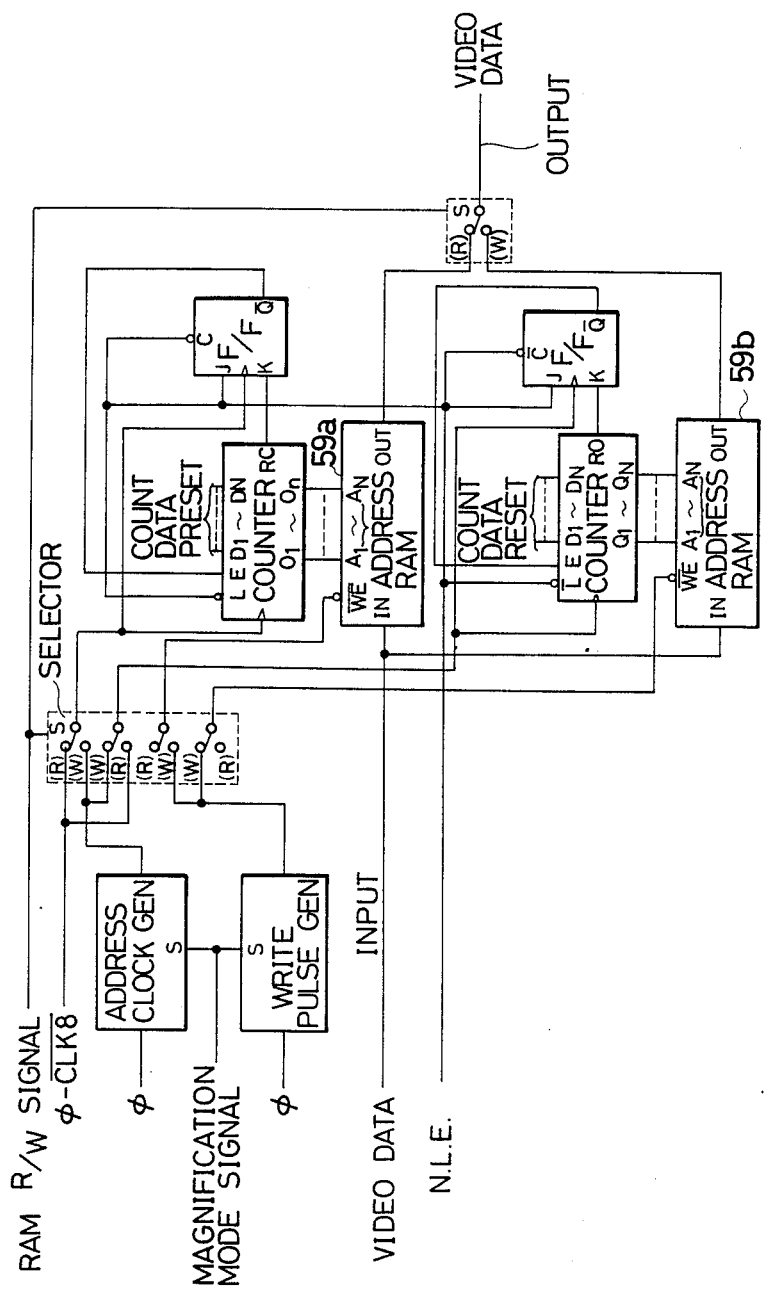
FIG. 7D is a detailed circuit diagram of the change-magnification buffer memory 31 of FIG. 3.
Figure 7E:
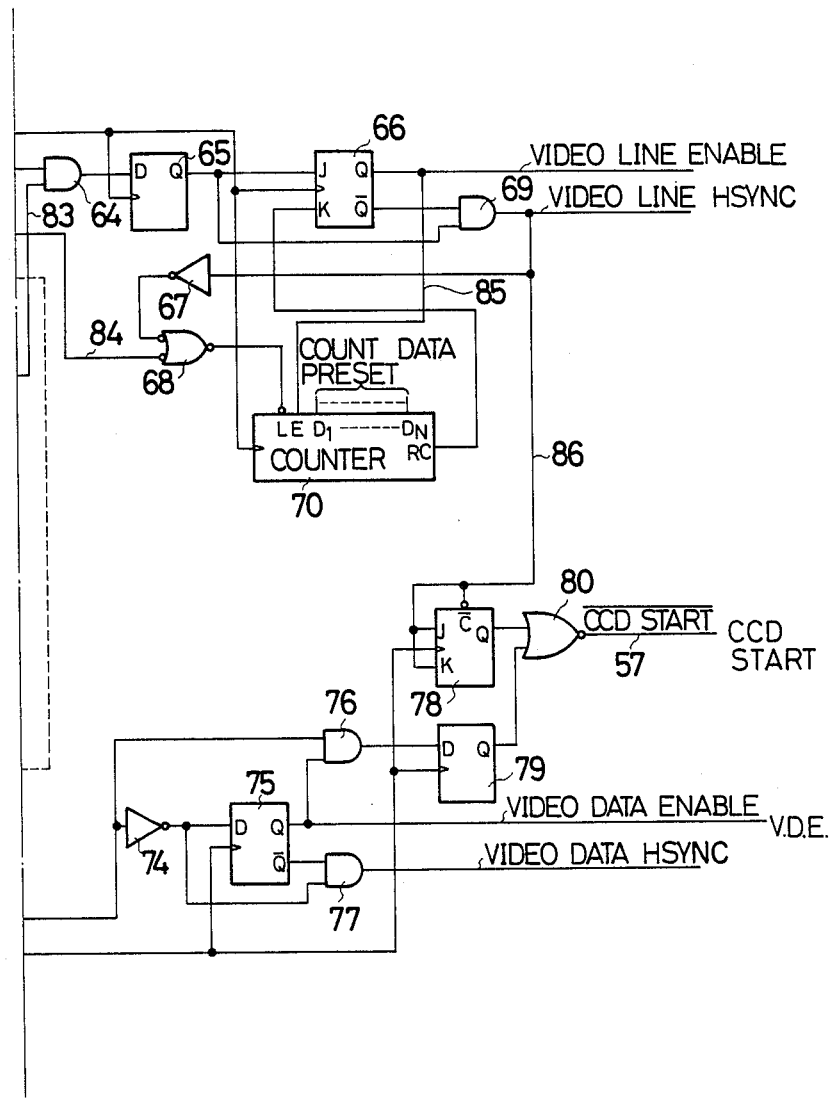
FIGS. 7Ea–b are detailed circuit diagrams of the video data sync signal generator 28 of FIG. 3.

This is accomplished by increasing or decreasing the number of clock pulses to be supplied to an address counter in a memory control circuit 2 which is inputted, in a write operation of the change-magnification buffer memory 31, with the change-magnification mode signal via line 50 from the image controller 24 (FIG. 7D). Therefore, of double buffer memories 59a and 59b in the change-magnification buffer memory 31, in the memory 59b in a write (W) mode the same pixel data is written at N addresses in case of the n magnification, and a single pixel among n pixels is written at one address in case of the 1/n magnification. Thus, in a read mode, as the address is counted by the video clock $\phi$-CLK 8, interpolation or thinning of the pixel data can be achieved. In the present embodiment, although the reader motor speed has been changed, the printer motor speed may be otherwise changed.

Another function of the change-magnification buffer memory 31 will be described with reference to FIG. 7D. The double buffer memories 59a and 59b in the change-magnification buffer memory 31 change their address count clocks respectively in read and write modes. Since the V.L.E. signal is generated from the encoder pulse from the reader main scan motor 6a, if there occurs a fluctuation in motor revolution, it causes a fluctuation in frequency. In this case, however, precision of position information for each main scan over the whole sub-scan area is unchanged. In order to ensure synchro with the V.L.E. signal and not to vary the storage time of CCDs, the period the CCDs read an image is set shorter than ½ the minimum value of the V.L.E. signal period, and the frequency of shift clocks $\phi$-CLK 4 of the CCD unit 17 is set greater than 2 times the frequency of the video clocks $\phi$-CLK 8. To this end, the address clock for the double buffer memories 59a and 59b uses in the equal magnification write operation, the shift clock $\phi$-CLK 4 of the CCD unit 17, and uses in the read operation the video clock $\phi$-CLK 8 which is a sync signal for pixel data of the reader and printer As seen from the foregoing, the change-magnification buffer memory 31 and memory control circuit 32 perform in the change-magnification mode interpolation and thinning operations of the pixel data in the sub-scan direction, and in addition maintain the storage time of the CCDs constant and perform a pixel read operation in synchro with the encoder pulse from the reader main scan motor 6a.

Image Signal Processing

The B, G and R three color video data subjected to the magnification process at the change-magnification buffer memory 31 is then transferred to an image process circuit 33 where processings shown in the block diagram of FIG. 8A are performed. First, the R, G and B three color video data is corrected by a shading correction 60 based on the reference white plane data read at step 9. In this embodiment, an image is read under the condition that light from the image ensures a linear relation between the exposure amount E to the CCDs and the light output voltage V. Thus, the shading correction is performed in accordance with the following equation.

$$V_s = \frac{V_{smax}}{V_{max}} \cdot V$$

wherein
Vs: an output after shading correction.
V: an output from the CCDs
Vmax: an output when the white plate is read, and
Vsmax: a set output.

The video data after shading correction is inputted to the next logarithmic transformation 61 where a light amount value is converted into an ink density value and simultaneously therewith complementary color correction is performed. The B, G and R video data is converted into Y, M and C density data. The conversion equation is given by the following equation, where D is the ink density, Ep is the reflected light amount from the reference white plane and E represents the image light amount.

$$D = -\log \frac{E}{Ep}$$

The converted three color density data is then inputted to black extract 62 and edge extract 63. Black extract means to calculate the ink amount to be jetted out based on the Y, M and C three color density data. This is done in view of the fact that black (hereinafter called Bk) representation by use of three kinds of Y, M and C ink is hard to obtain a perfect black and resultant increase in ink amount may result in an ink-stained copy sheet or an excessive swelled copy sheet. UCR (removal of foundation color) is a method to reduce the amount of each Y, M and C ink in accordance with the amount of black ink used in the black extract. In the present embodiment, the following calculation is performed.

Bk={min(Y,M,C)×a1}a2

Yout=(Y×a3Bk)a4

Mout=(M×a5Bk)a6

Cout=(c×a7Bk)a8 wherein a1 to a8 are arbitrary coefficients. Edge extract is to extract the edges and lines of an image and emphasize the contour of the image by adding the edge amount to the original image data with a particular relationship therebetween. In this embodiment, a convolution mask of 5×5 has been used in the sub-scan direction in extracting the edges. In order to remove the noise components from the amount of extracted edges, a method has been employed wherein a desired threshold is selected so as not to add a low level detection value to the image data. The edge extract also outputs a video data valid signal (hereinafter called V.D.V. signal) indicative of the range where edge extract through a Laplacian mask is possible during the video enable state. This in other words means that by using a 5×5 Laplacian mask, the V.D.V. signal is outputted at from the third or following V.L.E. signal after the V.E. signal is rendered active.

The density data Y, M and C after UCR is inputted to a masking 64 for masking process. Masking is a matrix operation for correcting impurity due to an unnecessary absorption of ink at the ink superposed position, and performs the following calculation.

$$\begin{bmatrix} Yout \\ Mout \\ Cout \end{bmatrix} = \begin{bmatrix} a11, & a12, & a13 \\ a21, & a22, & a23 \\ a31, & a32, & a33 \end{bmatrix} \begin{bmatrix} Y \\ M \\ C \end{bmatrix}$$

wherein a11 to a33 represent arbitrary coefficients. The density data of Y, M, C and Bk after masking process is inputted to an output gradation correction where correction to make the gradation flat is made, which gradation is obtained by means of a dither process during a quasi half-tone designation at the next binarization 66. The correction equations are expressed in the following:

$$Yout = \{a51(Y \times a52)\}a53$$

$$Mout = \{a54(M \times a55)\}a56$$

$$Cout = \{a57(C \times a58)\}a59$$

wherein a51 to a59 represent arbitrary coefficients.

The density data Y, M, C and Bk after the output gradation correction, and the edge amount ED are inputted to the binarization 66 for binarization process.

In the binarization process of this embodiment, first the image data is uniformely binarized by means of a systematic dither method and correction to a pixel concerned is effected in accordance with the edge data ED. That is, as the correction based on the truth table shown in FIG. 8B is effected, the image with unfocussed edge portions due to the systematic dither method becomes an image of quasi half-tone representation with an emphasized contour.

The video signal processed at the image process circuit 33 and converted into the binary signal (hereinafter called density data) of four Y, M, C and Bk colors is inputted via line 51 to a reader/printer sync memory 34.

Processings on the Printer

Figure 6D:
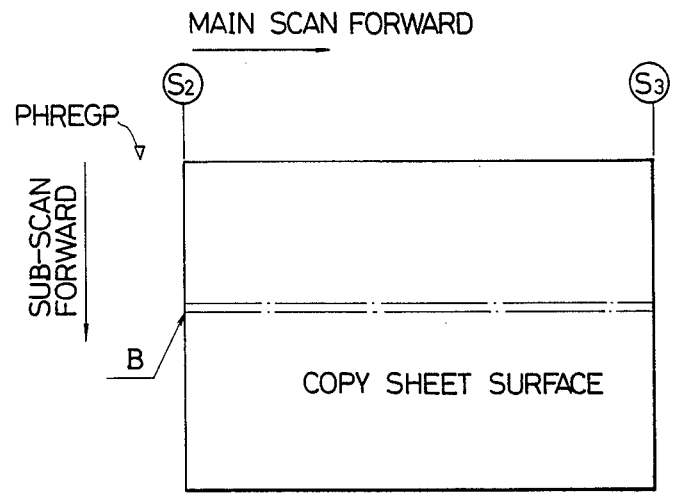
FIG. 6D is a view showing a relationship between a copy sheet and record sync signals.
Figure 6E:
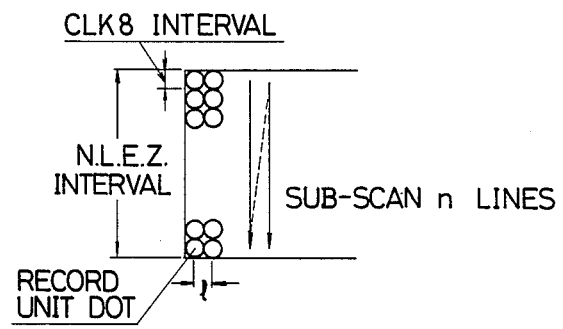
FIG. 6E is an enlarged view of the portion B of FIG. 6D.

Before the operation of the reader/printer sync memory 34 is described, a head data sync signal generator 37 will be described. As shown in FIGS. 6D and 6E, the head data sync signal generator 37 generates, in synchro with the encoder pulse from the printer main scan motor 6b, a nozzle line enable signal (hereinafter called N.L.E.) representing position information in the reader main scan direction and indicative of the effective area in the sub-scan direction of the head data having a resolution 1. The N.L.E. signal is delivered via line 52 to a head sync signal generator 38. The head sync signal generator 38 is supplied with a signal from a printer resist position sensor 16 via line 53. The head sync signal generator 38 outputs a nozzle enable signal (hereinafter called N.E.) for each color to the reader, by counting the N.L.E. signal and obtaining a time delay from the time when the BJ head unit 18 passes the resist position to the time when it reaches a copy position. The N.E. signal represents the copy width corresponding to a copy sheet size in the main scan direction.

The reader/printer sync memory 34 operates to buffer the speed difference between the reader main scan motor 6a and the printer main scan motor 6b, to accordingly output the density data inputted from the reader in synchro with the printer speed, i.e., in synchro with the N.L.E. signal. The reader/printer sync memory 34 sequentially writes the V.D.V signal when it is inputted from the image process circuit 33, i.e., writes the effective portion of the video data, in synchro with the V.L.E. signal. When the N.E. signal is inputted from the head sync signal generator 38, i.e., when there is the ink jet head within the copy area, the reader/printer sync memory 34 sequentially reads the density data stored therein as head data, in synchro with the N.L.E. signal. Data for each record head read out of the reader/printer sync memory 34 is outputted via line 55 to a printer sync circuit 35.

Head data for all of the four colors Y, M, C and Bk for an image at position S1 on the document is inputted at the same time to the printer sync circuit 35, which performs a position displacement process for the respective four color head data, by the amount corresponding to the distance between the respective heads in the main scan direction.

Figure 6F:
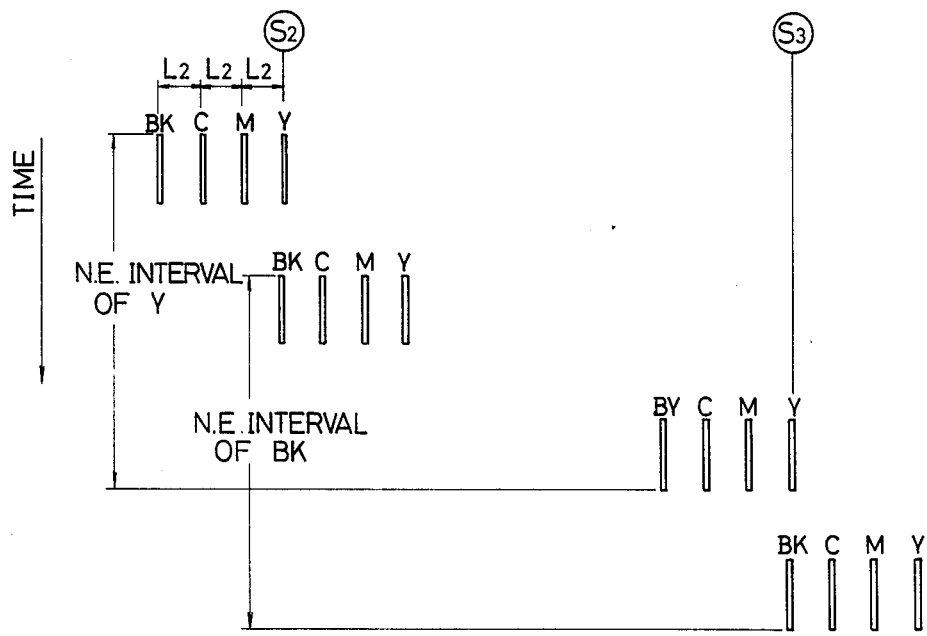
FIG. 6F is a view for explaining position displacements of respective color ink jet heads.

In particular, as shown in FIG. 6F, it is here assumed that the distance between the respective ink jet heads for the corresponding colors Y, M, C and Bk is L2 and the main scan speed is V. To make an image, which is to be formed by four color ink Y, M, C and Bk on the document, be correctly aligned on the same position in the main scan direction of the ink jet heads, each color head is actuated to jet out ink with a time delay of L2/V. More in particular, each color head data of M, C and Bk is temporarily stored in the buffer memories in the printer sync circuit 35 until each color head reaches the position in the main scan direction where the Y head formed an image at the first time. At such timings, each color head data is sequentially outputted from the printer sync circuit 35 and inputted to a BJ head drive 36. In FIG. 6F, the vertical direction is not the sub-scan direction but the time axis.

The printer sync circuit 35 is inputted also with the N.E. signal indicative of a copy area for the Y head. Based upon the N.E. signal, the printer sync circuit 35 outputs a head drive enable signal (hereinafter called H.D.E. signal) for each color indicative of a jet interval of each color head, and inputs it via line to the BJ head drive 36. The BJ head drive 36 outputs, based on the N.E. signal, N.L.E. signal, H.D.E. signal and clock $\phi$, to the BJ head unit 18 a drive signal for the ink jet heads and each color head data.

In accordance with the foregoing sequence, an image of the document is read by the reader 3 and the image is reproduced by the printer 4. Upon detection of the V.E. signal and N.E. signal respectively generated from the reader 3 and printer 4, the image controller 24 determines the end of one-line main scan copy (step 14) follow step 15.

Post-process

At step 15 the sequence controller 23 first turns off the exposure lamp 19 and inputs a motor OFF signal to the motor driver circuits 26a and 26b of the reader and printer. Thereafter, a backward speed data and a rotation start signal are supplied to the motors 6a and 6b to turn them on for a backward movement until they stop at the respective main scan home-positions 11 and 12. At step 16, a stepping motor 9a for the reader sub-scan (hereinafter called reader sub-scan motor) is supplied with a predetermined number of pulses corresponding to a magnification in a sub-scan forward rotation mode, to thereby effect one-line sub-scan feed. Similarly, a stepping motor 9b for the printer sub-scan (hereinafter called printer sub-scan motor) is also driven by one-line sub-scan. Next, at step 17, a sub-scan counter is incremented. At step 18, it is checked if the count of the sub-scan counter has reached the value corresponding to the copy width or not. If not, step 8 resumes to repeat a main scan until the sub-scan counter comes to a count-up state. When the sub-scan counter comes to a count-up state, step 2 follows, where a predetermined number of pulses are sent to the respective sub-scan motors of the reader and printer in a sub-scan backward rotation mode, to thereby return them to the homepositions. Next, at step 3, a head recover operation is performed for cleaning the ink jet nozzle head after the end of copy, and at step 5 the following copy instruction is waited for. The foregoing is the outline of the operation of the apparatus.

Spatial Filtering Process

Figure 9A:
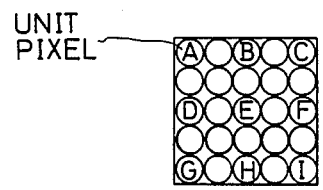
FIG. 9A is a view showing a convolution mask.

The details of the spatial filtering process will be described with reference to FIGS. 9A to 9E and FIGS. 10 and 11. As previously described, in the present embodiment edge extract is performed using a 5×5 convolution mask which is shown in FIG. 9A. The coefficient can be expressed by the following equation, and the edge amount ED of the center pixel E is derived as a secondary differential (Laplacian) with its polarity.

$$E = (A+B+C+D+F+G+H+I)/8$$

Figure 9B:
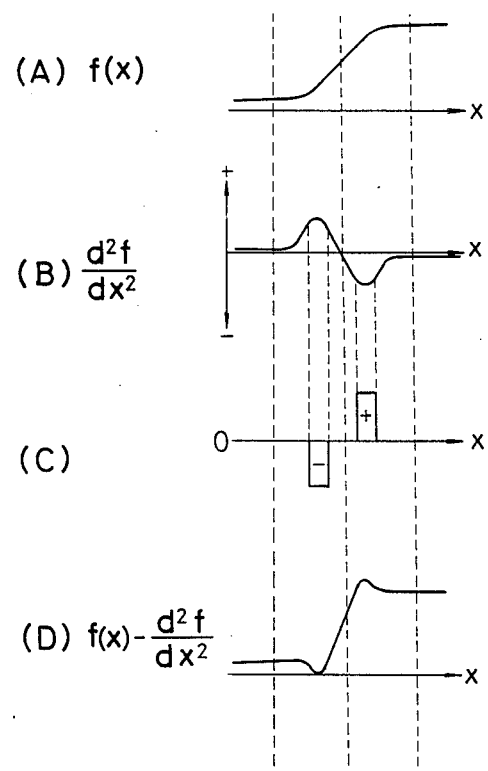
FIG. 9B is a view for explaining a contour emphasis by spatial filtering.
Figure 10:
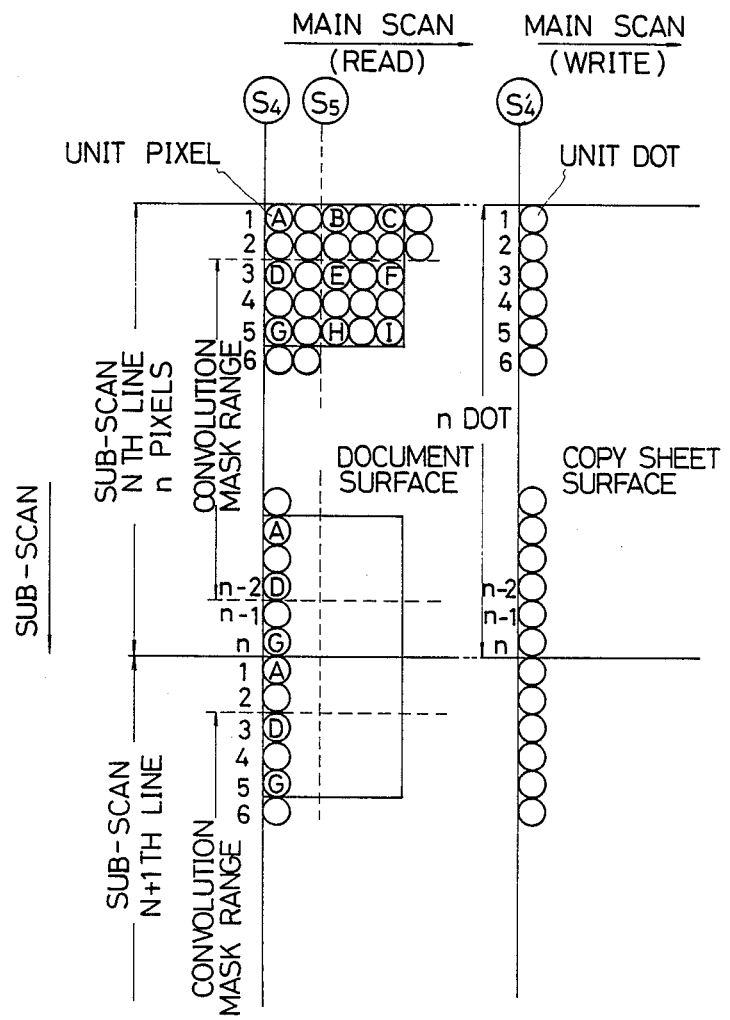
FIG. 10 is a view for explaining a scan method used in a similar apparatus to that of the present embodiment.

In general, a change in shade or color of an image is expressed by f(x) as in FIG. 9B(A) where x represents a distance in one-scan direction along the image. The secondary differential of f(x), i.e, $$\frac{d^2 f}{dx^2}$$

becomes as shown in FIG. 9B(B) and $$f(x) - \frac{d^2 f}{dx^2}$$

becomes as shown in FIG. 9B(D). It is thus known that the above operation is effective in emphasizing a change of an image. The contour of an image can be emphasized in all directions by using a square mesh or Laplacian mask relative to the main and sub-scan directions.

In this embodiment, the spatial filtering process for emphasizing the contour is performed by using a Laplacian mask and convolution operation. When applying the Laplacian mask to the scan system of this embodiment, there is a problem as shown with FIG. 10. In particular, taking sub-scan in Nth and (N+1)th lines into consideration, the mask application range is from 3rd pixel to (n−2)th pixel if the number of CCD pixels is n. This is because if a mask is to be applied to a discontinuous portion of a read image and its pixel concerned (center pixel) comes near the end of the mask range, the number of mask data pixels becomes insufficient. To solve this problem, the pixel data at the discontinuous portion, i.e., the end data at the V.L.E. in Nth line sub-scan, may be stored in a memory to use it as the top data at the V.L.E. in (N+1)th line sub-scan. However, in this case, if an A1 size document is read with 16 line/mm resolution, it is necessary to use 26.3 K Byte (as of 8 bit/pixel) and a counter of 13456 steps, in view of the product of A1 longer width × resolution × the number of store lines. Also, a complicated control circuit is required. To solve this problem, in the present invention the following method has been embodied, which will be described with reference to FIG. 11.

In the present embodiment using a 5×5 mask, assuming that the number of CCD pixels for reading the document is m, then the end pixels from (m×3)th to mth at the V.L.E. signal in Nth line sub-scan are read, and thereafter in (N+1)th line sub-scan they are again read as the top pixels from 1st to 4th at the V.L.E. signal. As a result, the Laplacian mask is applied to all of the pixels to be read, thereby enabling to obtain an image with a whole contour emphasized. Furthermore, the number of data n of the ink jet heads becomes m−4, so that it sufficient even if the number of recorder heads is less than that of CCD pixels. The feed width per one step in the printer sub-scan also becomes m−4. This can be expressed in the following equation:

$$n = m - (x - 1)$$

wherein
  m: the number of image sensor read pixels,
  n: the number of printer elements in the multiple write head;
  x: the number of meshes along one direction of the mask.

Figure 11B:
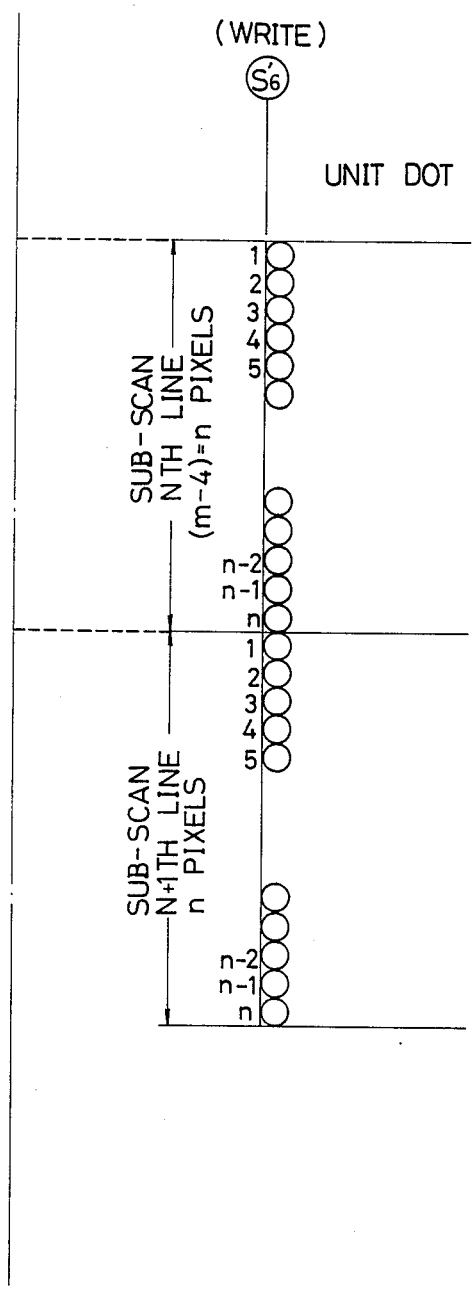

The above equation is applied when all of the image sensor read pixels are used. In case all the pixels are not used, it suffices if n≧m−(x−1) is met. As to the main scan direction, assuming that S6 in FIG. 11 is the end portion of the document, the video data area range starts from S7 and terminates at two pixels before the end portion of the document. However, the read operation continues to the end portion of the document.

Encoder

Next, a particular construction of the encoder will be described with reference to FIG. 7E. When the reader main scan motor 6a starts a main scan at step 12 shown in FIG. 5, the encoder pulses from the motor encoder 7a are inputted via line 42 to the video data sync signal generator 28 and demultiplied by 1/n by the first stage fixed demultiplier 71a of a frequency demultiplier 71. The effect of the fixed demultiplier 71a will now be described.

The encoder pulses and their demultiplied leading edges are schematically shown in FIGS. 12A, 12B, 12D and 12E. FIGS. 12C, 12F and 12G show waveforms of the encoder pulses and their demultiplied pulses observed with an oscilloscope for example. The period T0 of the ideal encoder pulses is constant and the period T1 of the demultiplied pulses also becomes constant. However, in practice, the actual period of the encoder pulses has an error ΔT0 relative to T0 due to the angle error caused by the work precision of the encoder, backlash, play, work precision and so on of the main scan drive mechanism, and load variation. If such actual encoder pulses are used as the position information of pixels, the discontinuous portions in the sub-scan direction become uncontrolled. However, demultiplication of the encoder pulses makes such error to be averaged so that T1:ΔT1 (angular difference of the demultiplied pulse periods) becomes small as compared with T0:ΔT0. In this embodiment, the ratio of error was smaller than ½, as seen from T=52 μs, ΔT0=3.6 μs (6.9%), T1=625 μs, ΔT1=20 μs (3.2%).

The motor encoder pulse φM with the error reduced at the fixed demultiplier 71a is demultiplied at the next stage variable demultipliers 71b to 71e as shown in FIG. 7A. Thus demultiplied encoder pulses are then gated at the AND circuits 72a to 72d and an OR circuit 73 in response to a magnification mode signal inputted via line 49 to thereby select one of them as a demodulated pulse φM4. As a result, even if the speed of the reader main scan motor 6a varies with a magnification factor during the magnification mode copy, the pulse φM4 of a constant period generates. Thus, during the reader main scan, the number of lines to be read in a magnification mode changes with a magnification factor at each interval between S10 to S12, as shown in FIG. 7B. Therefore, irrespective of a magnification factor a high resolution magnification copy is possible. Upon detection of an output from the reader resist position 15 during the reader main scan, a D-type flip-flop 61 (hereinafter called D-F/F), J/K-F/F 62 and NAND circuit 63 operate to generate a $\overline{\text{CNT DE LOAD}}$ signal and CNT φM4 ENABLE signal in synchro with the rise of the video clock $\overline{\text{CLK8}}$, as shown in the timing chart of FIG. 7F. The CNT φM4 ENABLE signal is inputted via line 81 to an AND circuit 64 and via line 84 to an AND circuit 68.

Figure 7F:
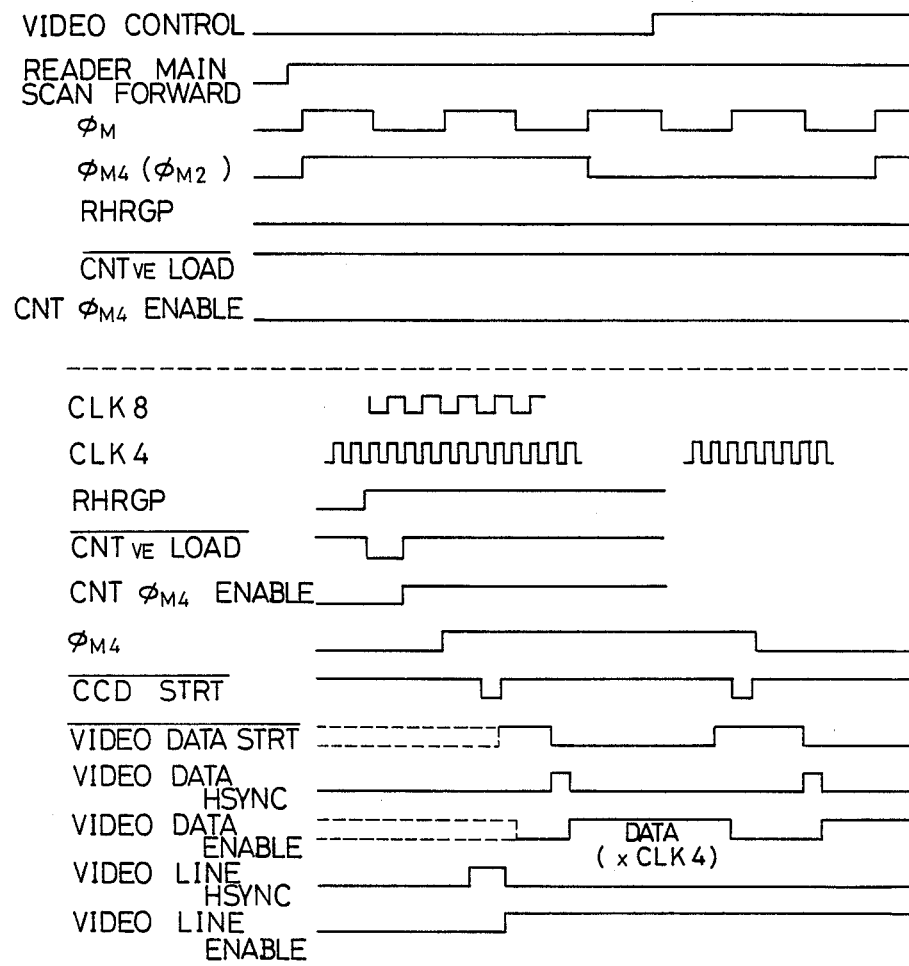
FIGS. 7Fa–b are timing charts of the video data sync signals.
Figure 7F:
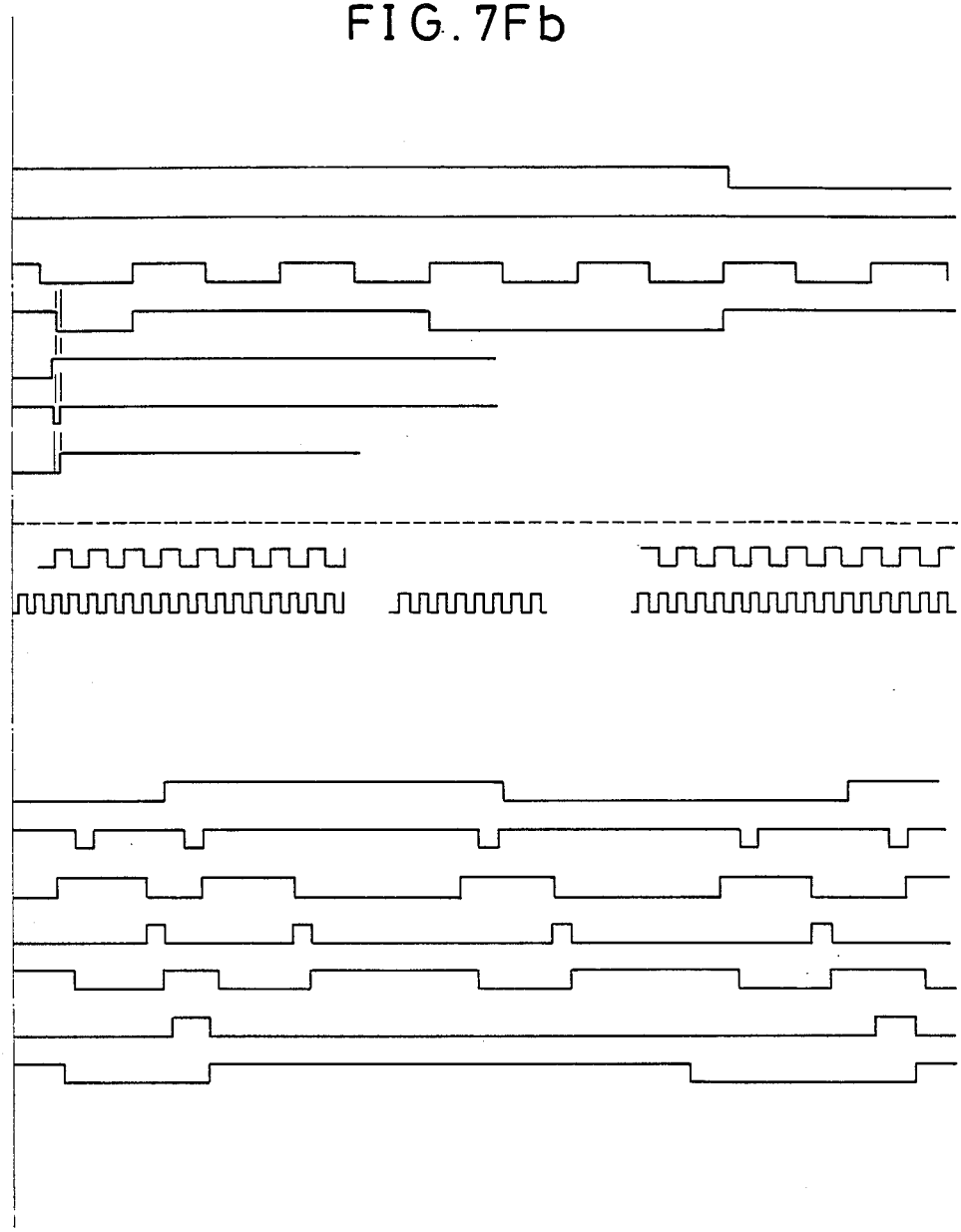

Since the AND circuit 64 is being supplied with φM4 through line 84, the φM4 continues to be outputted from the time when CNT φM4 ENABLE signal is inputted thereto. Thereafter, a D-F/F 65, J/K-F/F 66, AND circuit 69, inverter circuit 67, counter 70 and AND circuit 68 operate to generate a V.L.E. (VIDEO LINE ENABLE) signal and VIDEO LINE HSYNK signal (hereinafter called V.L.H. signal) at the timings as shown in FIG. 7F. More in particular, when the CNT φM4 ENABLE is inputted to the AND circuit 68 via line 84, the counter 70 releases the load state of the load terminal so that input of a count preset value from terminals $D_1$ to $D_N$ is completed. Thereafter, the V.L.H. signal is outputted from the AND circuit 69, and the V.L.E. signal is outputted from the J/K-F/F 66. Then, the V.L.E. signal is inputted to the count enable terminal E of the counter 70 via line 85 to start counting the leading edges of the $\overline{\text{CLK8}}$. When the count of the preset value is completed, a ripple clock is outputted from the terminal RC and inputted to the K terminal of the J/K-F/F 66 to terminate the V.L.E. signal interval in synchro with the $\overline{\text{CLK8}}$. As described above, after the detection of an output from the reader resist position sensor 15 and the rise of the φM4, the video clock $\overline{\text{CLK8}}$ is counted during the time corresponding to the interval of the V.L.E. signal preset in the counter 70. That is, the V.L.E. signal corresponding to the one-line pixels is outputted.

Since the V.L.H. signal is coupled via line 86 to the clear terminal C and terminals J and K of the J/K-F/F 78, during the interval while the V.L.H. signal is generated, a CCD start signal (hereinafter called CCD START signal) is outputted once from a NOR circuit 80. The CCD START signal has a duration of one cycle of the clock φ-CLK4 from which a demultiplied signal φ-CLK8 is produced. The $\overline{\text{CCD STRT}}$ signal is inputted via line 57 to the CCD drive 29, which reads data from the CCD unit 18 in synchro with the CCD START signal, outputs a video data start signal (hereinafter called $\overline{\text{VIDEO DATA STRT}}$) shown in FIG. 7E, and inputs it via line 87 to the video data sync signal generator 28.

The interval of the $\overline{\text{VIDEO DATA STRT}}$ signal stands for the one-line effective image range for respective color CCDs in the CCD unit 17.

The $\overline{\text{VIDEO DATA STRT}}$ signal inputted via line 87 to the video data sync signal generator 28 is converted into the video data enable signal (V.D.E. signal) by means of an inverter 74, D-F/F 75 and AND circuit 77 from which the signal is outputted. The CCD START signal is again outputted at the rise of the V.D.E. signal during an interval of one cycle of the CLK4, via an AND circuit 76, D-F/F 79 and NOR circuit 80.

As described above, the $\overline{\text{CCD STRT}}$ signal is first forcibly outputted after the rise of φM4, and thereafter it is outputted at a constant period. Since the clock φ-CLK4 two times as fast as the video clock φ-CLK8 is used in reading video signals from the CCD unit, it is possible to read the video signals two times during the interval of the V.D.E. signal. By sampling the video signals read at the second time, an image in synchro with φM4 can be read without changing the storage time of the CCDs.

The $\overline{\text{CNT VE LOAD}}$ signal is inputted via line 82 to the frequency demultiplier 71 to clear all of the internal multipliers 71a to 71e. Therefore, simultaneously with the detection of an output of the reader resist position sensor 15, the rise of φM4 occurs. In other words, the detection of an output from the resist position sensor 15 is possible within an error corresponding to one pulse of the motor encoder pulses at the maximum speed.

The head data sync signal for the printer is obtained simulasly to the above operation associated with the reader. That is, in the head data sync signal generator 37, after the detection of an output from the printer resist position sensor 16, the demultiplied pulses, obtained by demultiplying the encoder pulses from the printer main scan motor 6b, are reset. In response to the reset pulse, the N.L.E. signal can be obtained.

The printer encoder pulses are demultiplied, similarly to the reader encoder pulses, at the frequency demultiplier in the head data sync signal generator 37 to thereby reduce an error which might be included in the encoder pulses. The N.L.E. signal is generated based upon the demultiplied pulses and a record operation by the head is controlled by the BJ head drive.

In the above embodiment, the main scan has been made in the direction perpendicular to the alignment direction of the elements of the image sensor and write head, and the sub-scan has been made in the direction perpendicular to the main scan direction. Image formation has been performed by repeating the main scan operation. However, the present invention is also applicable to the case wherein a full-line read sensor and full-line write sensor are used and spatial filtering is performed along the alignment direction of the elements. In other words, the present invention is applicable to all cases wherein both elements of the read sensor and write head are aligned in the same direction as the respective scan directions.

As described in the foregoing, the image sensor having a plurality of read elements is repetitively scanned in the direction generally perpendicular to the alignment direction of the read elements to obtain the whole image of on sheet. In this case, the discontinuous portion between Nth scan and (N+1)th scan is read in an overlap way so that a high quality image can be obtained without using additional memories and any unnaturalness of the image at the discontinuous portion can be eliminated.

Furthermore by setting the number of read elements of the image sensor larger than the sum of the number of record elements of the write head and [the number of object pixels-1] in the head alignment direction within the spatial filtering range, it is possible to perform spatial filtering process over the whole image range by reading in an overlap way the discontinuous portion of the image and reduce the memory capacity of the apparatus.

The present invention is not intended to be limited to the above embodiment, but various applications and modifications may be made within the scope of the following appended claims.

What is claimed is:

1. An image processing apparatus comprising:
   (a) means for reading out an object, said reading means having at least three reading element groups, each group including a concerned pixel reading element and a peripheral pixel reading element, said concerned pixel reading element and peripheral pixel reading element being linearly arranged in a predetermined direction;
   (b) first scan means for scanning the object in a second direction inclined by a predetermined angle from said predetermined direction in said reading means; and
   (c) second scan means for scanning the object along a direction transverse to said second direction so that at least part of a read-out range of said peripheral pixel reading element is overlapped.

2. An image processing apparatus according to claim 1, further comprising processing means for performing two-dimensionally spatial filtering of an output read by said reading means.

3. An image processing apparatus according to claim 1, wherein the direction of scanning of said second scan means coincides with said predetermined direction.

4. An image processing apparatus according to claim 1, wherein said predetermined angle is substantially a right angle.

5. An image processing apparatus comprising:
   means for reading an object, said reading means having at least three reading element groups, each group including a concerned picture cell reading element and a peripheral picture cell reading element, said concerned picture cell reading element and said peripheral picture cell reading element being linearly arranged in a predetermined direction;
   processing means for processing image data read by said reading means and determining data corresponding to the concerned picture cell of said image data by using peripheral picture element data for the respective concerned picture cell; and
   recording means comprising a plurality of recording elements for recording in accordance with a processed output from said processing means,
   wherein the number of reading elements of said reading means which are arranged in said predetermined direction is larger than the number of recording elements of said recording means in said predetermined direction.

6. An image processing apparatus according to claim 5, further comprising:
   reading main scan means for main-scanning said reading means in a direction substantially perpendicular to an alignment direction of said reading elements;
   recording main scan means for main-scanning said recording means in the direction substantially perpendicular to the alignment direction of said recording elements;
   reading sub-scan means for sub-scanning said reading means in the direction substantially perpendicular to said main scan direction; and
   recording sub-scan means for sub-scanning said recording means in the direction substantially perpendicular to said sub-scan direction.

7. An image processing apparatus according to claim 6, wherein the directions of the sub-scan of said reading and recording sub-scan means coincide with said predetermined direction.

8. An image processing apparatus according to claim 5, wherein said processing means performs a contour emphasizing process.

9. A read-out method for reading out an original by means of a read-out device that has at least three reading element groups, each said group including a concerned pixel read-out element and a peripheral pixel read-out element are linearly arranged in a sub-scan direction, comprising the steps of:
   (a) reading out a signal in a main-scan direction from the read-out elements;
   (b) moving the read-out elements in a sub-scan direction so that a read-out range of the peripheral pixel read-out elements is overlapped; and
   (c) alternately repeating said reading and moving steps.

10. A read-out method according to claim 9, wherein said read-out range is a range read out by the read-out elements.

11. A read-out method according to claim 9, wherein the sub-scan direction is not parallel to the main-scan direction.

12. A read-out method according to claim 9, further comprising the step of:
    (d) detecting that a distance through which the read-out elements have been moved in said sub-scan step has reached a predetermined limit.

13. An apparatus comprising:
    (a) read-out means for reading out an object, said read-out means having at least three reading element groups, each said group including concerned-pixel read-out elements and peripheral-pixel read-out elements, with said concerned-pixel read-out elements and said peripheral-pixel read-out elements being linearly arranged in a predetermined direction;
    (b) processing means responsive to image data read out by said read-out means for determining the concerned pixel by using peripheral pixel data from said peripheral-pixel read-out elements; and
    (c) recording means including a plurality of recording elements for recording in accordance with a processed output from said processing means,
    wherein the number of said read-out elements is larger than the number of said recording elements.

14. An apparatus according to claim 13, wherein said read-out means includes:
    (a) a plurality of read-out elements arranged in a predetermined direction;
    (b) main-scan means for moving said plurality of read-out elements in a direction transverse to said predetermined direction; and
    (c) sub-scan means for moving said plurality of read-out elements in said predetermined direction.

15. An apparatus according to claim 13, wherein said processing means includes filtering means for filtering said image data in accordance with a predetermined transfer characteristic.

16. An apparatus according to claim 13, wherein said recording means includes:
(a) recording elements arranged in a predetermined direction;
(b) main-scan means for moving said plurality of recording elements in a direction transverse to said predetermined direction; and
(c) sub-scan means for moving said plurality of read-out elements in said predetermined direction.

17. An apparatus according to claim 14, wherein the moving direction of said main-scan means is perpendicular to said predetermined direction.

18. An apparatus according to claim 16, wherein the moving direction of said main-scan means is perpendicular to said predetermined direction.

19. An image processing apparatus comprising:
reading means operable to read a band of an image extending across a document and to provide color component data relating to a plurality of different color components for a plurality of pixels extending in an array along the length of and across the width of the band, the reading means including a row of reading elements extending across the width of the band;
means for scanning the reading means and document relative to each other so that the band read by the reading means upon a subsequent operation of the reading means overlaps the band read by the reading means during an immediately preceding operation of the reading means and so that the predetermined portion of the band read by the reading means upon the subsequent operation of the reading means abuts the predetermined portion of the band read by the reading means upon the subsequent operation;
first processing means for processing the color component data for all of the color components for each pixel within the predetermined portion of the band in dependence upon the color component data for another pixel in the band to produce a control signal common to the color component data for that pixel; and
second processing means for processing the color component data for all of the color components for each pixel within the predetermined portion of the band in dependence upon the common control signal for the pixel.

20. An apparatus according to claim 19, wherein the first processing means is operable to modify the color component data for each pixel within the predetermined portion of the band by the color component data for at least one further pixel offset from the first-mentioned pixel in the width direction of the band in producing the control signal for the first-mentioned pixel.

21. An apparatus according to claim 19, wherein the first processing means is operable to modify the color component data for each pixel within the predetermined portion of the width of the band and within a predetermined portion of the length of the band by color component data for pixels offset from the first-mentioned pixel in the length direction of the band in producing the control signal for the first-mentioned pixel.

22. An apparatus according to claim 19, wherein the reading means includes means to scan the row of reading elements and the document relative to reach other in the length direction of the band.

23. An apparatus according to claim 22, wherein a plurality of such rows of reading elements are provided, each row of reading elements being sensitive to a respective one of the color components.

24. An apparatus according to claim 19, wherein reading elements extend along the length of the band so that the reading means provides a full-line sensor.

* * * * *

UNITED STATES PATENT AND TRADEMARK OFFICE
CERTIFICATE OF CORRECTION

Page 1 of 3

PATENT NO. : 4,876,612
DATED : October 24, 1989
INVENTOR(S) : TOSHIO HONMA, ET AL.

It is certified that error appears in the above-identified patent and that said Letters Patent is hereby corrected as shown below:

Title page:

IN [56] REFERENCES CITED

U.S. PATENT DOCUMENTS, --4,228,489 10/1980 Ford, Jr." should read --4,228,469 10/1980 Ford, Jr.--.

FOREIGN PATENT DOCUMENTS, "91798A3 10/1983" should read --91798A2 10/1983--.

IN [57] ABSTRACT

Line 8, "reading" should read --read-out--.

SHEET 19 OF 24

FIG. 8A, "ROGARITHMIC" should read --LOGARITHMIC--.

COLUMN 1

Line 19, "400 dot/inch," should read --400 dots/inch,--.

COLUMN 4

Line 6, "includes" should read --include--.

COLUMN 5

Line 1, "(as" should read --(As--.
Line 2, "6F)" should read --6F).--.

UNITED STATES PATENT AND TRADEMARK OFFICE
CERTIFICATE OF CORRECTION

PATENT NO. : 4,876,612
DATED : October 24, 1989
INVENTOR(S) : TOSHIO HONMA, ET AL.

It is certified that error appears in the above-identified patent and that said Letters Patent is hereby corrected as shown below:

COLUMN 6

Line 62, Close up right margin.
Line 63, Close up left margin.
Line 66, "magnification" should read
--magnification.--.

COLUMN 7

Line 8, "memory control circuit 2" should read
--memory control circuit 32--.
Line 45, "printer" should read --printer.--.

COLUMN 8

Line 39, "Bk={min(Y,M,C) x a1}a2" should read
--Bk={min(Y,M,C) x -a1}a2--.
Line 41, "Yout=(Y x a3Bk)a4" should read
--Yout=(Y x -a3Bk)a4--.
Line 43, "Mout=(M x a5Bk)a6" should read
--Mout=(M x -a5Bk)a6--.
Line 45, "Cout=(c x a7Bk)a8" should read
--Cout=(c x -a7Bk)a8--.

COLUMN 9

Line 9, "output gradation correction" should read
--output gradation correction 65--.
Line 16, "Yout={a51(Y x a52)}a53" should read
--Yout={a51(Y x -a52)}a53--.
Line 18, "Mout={a54(M x a55)}a56" should read
--Mout={a54(M x -a55)}a56--.

UNITED STATES PATENT AND TRADEMARK OFFICE
CERTIFICATE OF CORRECTION

PATENT NO. : 4,876,612

DATED : October 24, 1989

INVENTOR(S) : TOSHIO HONMA, ET AL.

It is certified that error appears in the above-identified patent and that said Letters Patent is hereby corrected as shown below:

COLUMN 9

Line 20, "Cout={a57(C x a58)}a59" should read
--Cout={a57(C x -a58)}a59--.

COLUMN 10

Lines 49-50, "follow step 15" should read --and the flow proceeds to step 15--.

COLUMN 12

Line 5, "(m x 3)th" should read --(m-3)th--.
Line 13, "sufficient" should read --is sufficient--.

COLUMN 16

Line 18, "element are" should read --element that are--.

Signed and Sealed this

Fourth Day of February, 1992

Attest:

HARRY F. MANBECK, JR.

*Attesting Officer*   *Commissioner of Patents and Trademarks*